Nov. 13, 1934.  W. H. PETIT ET AL  1,980,546
PHOTOGRAPHIC CAMERA
Filed March 29, 1933    18 Sheets-Sheet 3

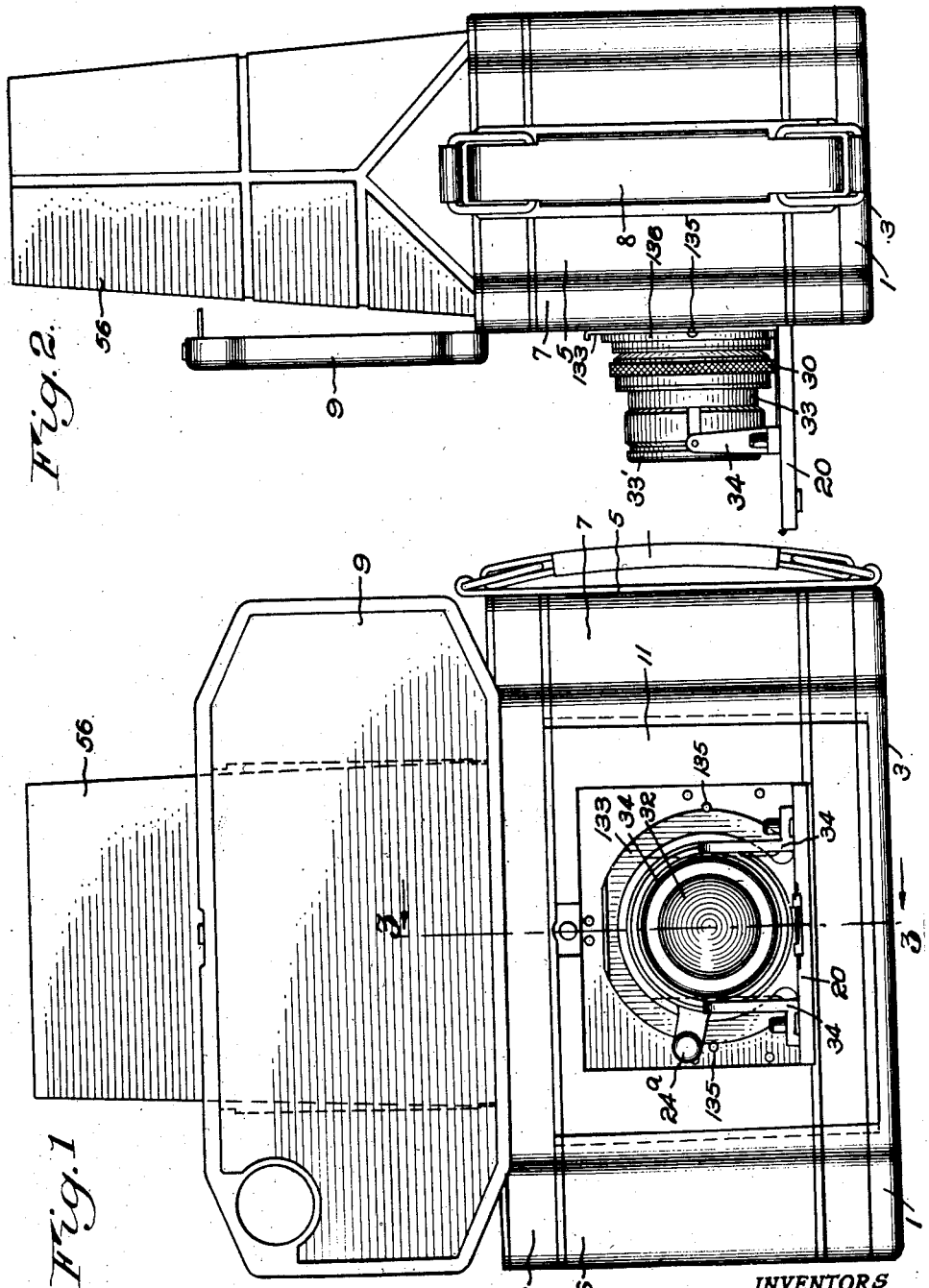

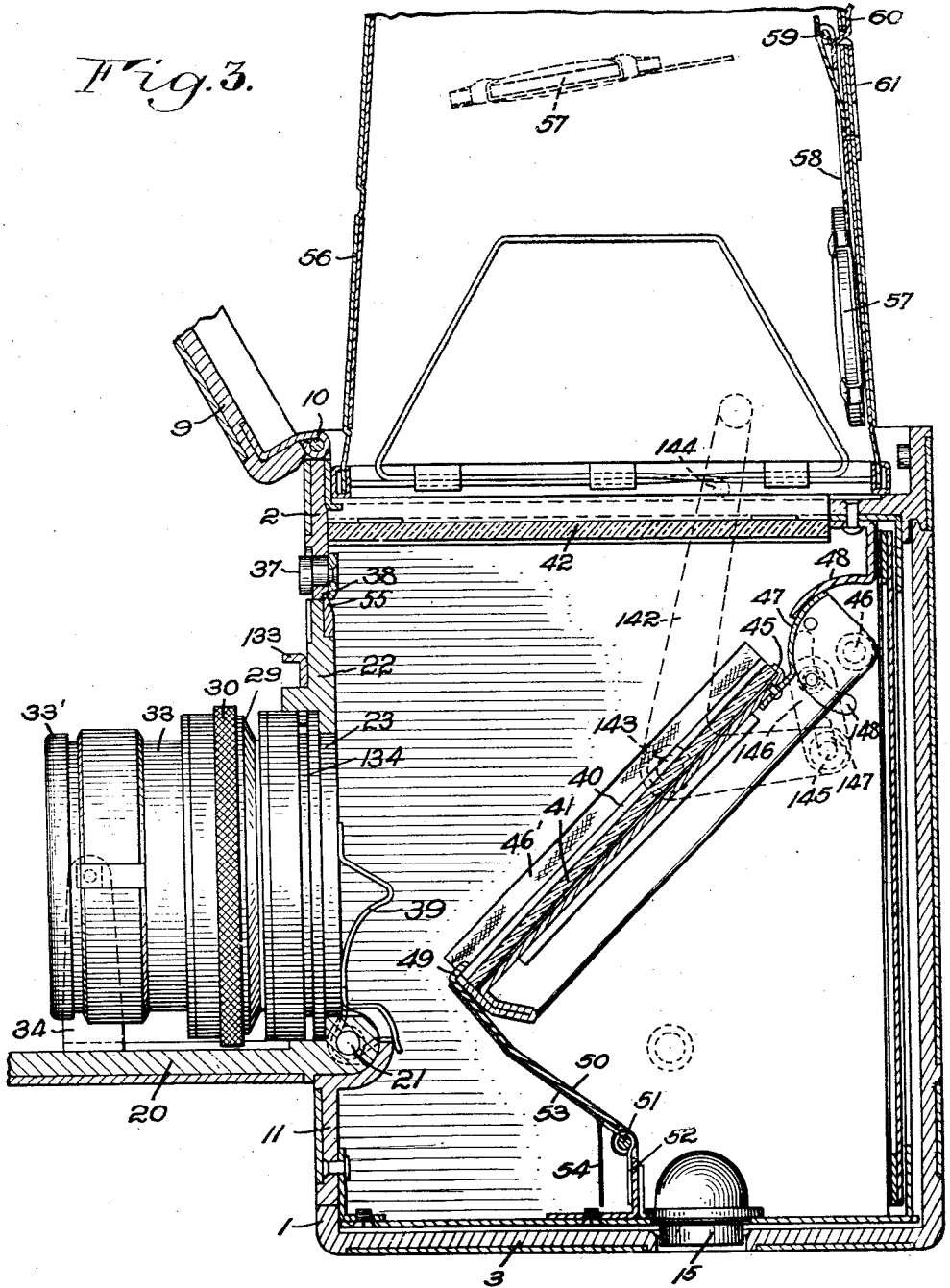

INVENTORS
William H. Petit
Edson S. Hineline
BY
Their ATTORNEYS

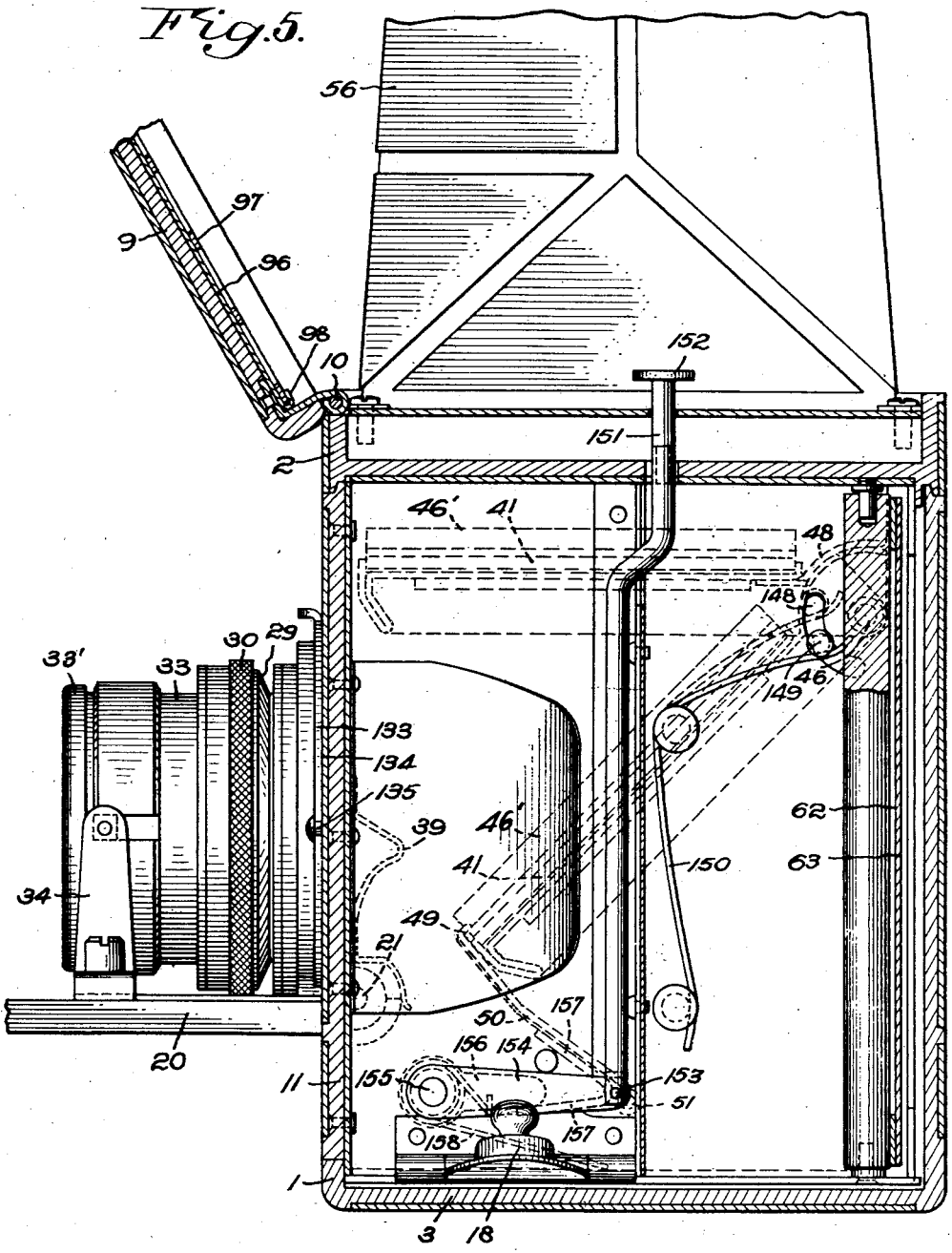

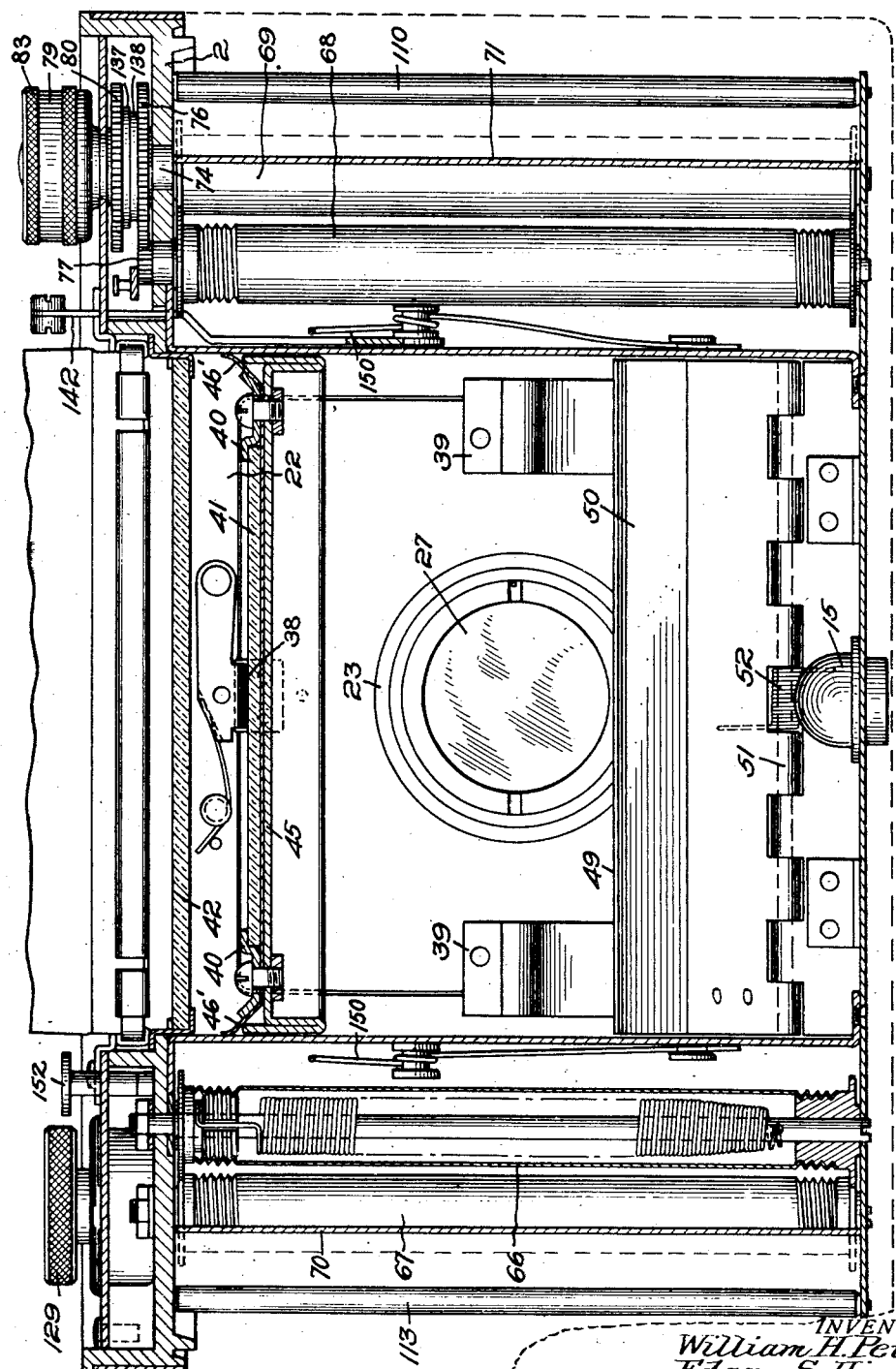

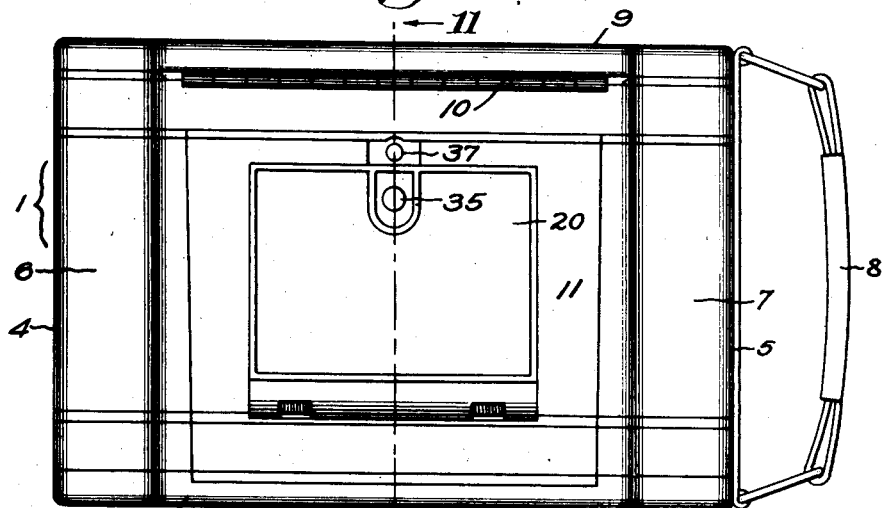
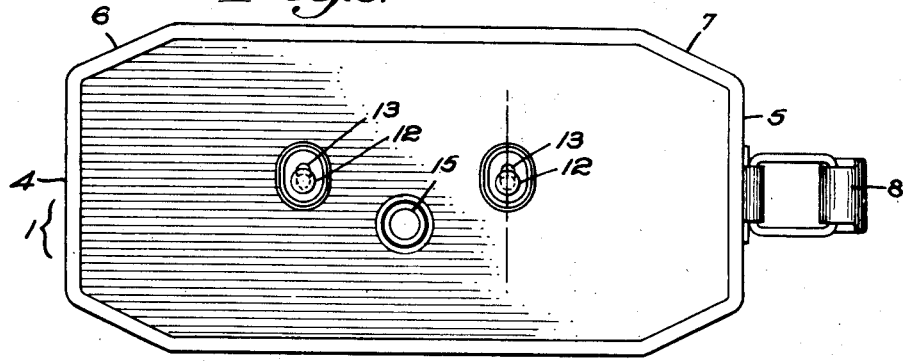
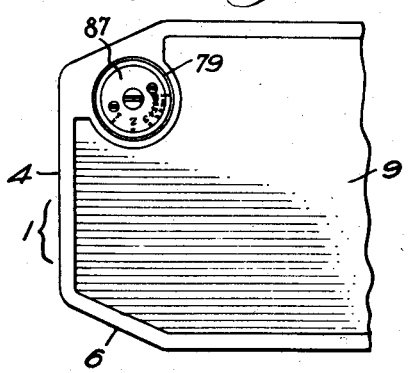
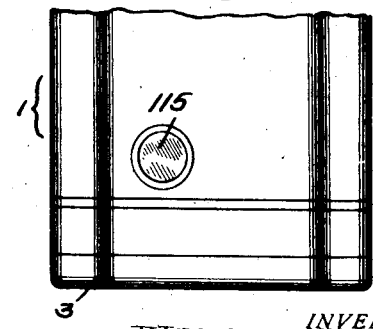

Nov. 13, 1934.  W. H. PETIT ET AL  1,980,546
PHOTOGRAPHIC CAMERA
Filed March 29, 1933  18 Sheets-Sheet 7

INVENTORS
William H. Petit
Edson S. Hineline
BY
their ATTORNEYS

Nov. 13, 1934.　　W. H. PETIT ET AL　　1,980,546
PHOTOGRAPHIC CAMERA
Filed March 29, 1933　　18 Sheets-Sheet 9

INVENTORS
William H. Petit
Edson S. Hineline
BY
their ATTORNEYS

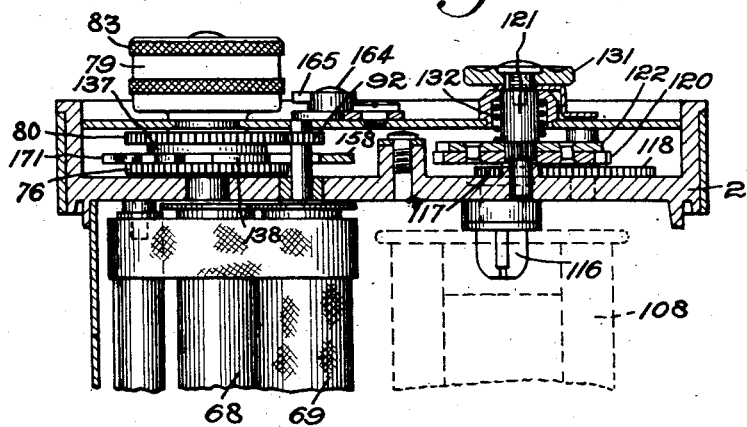
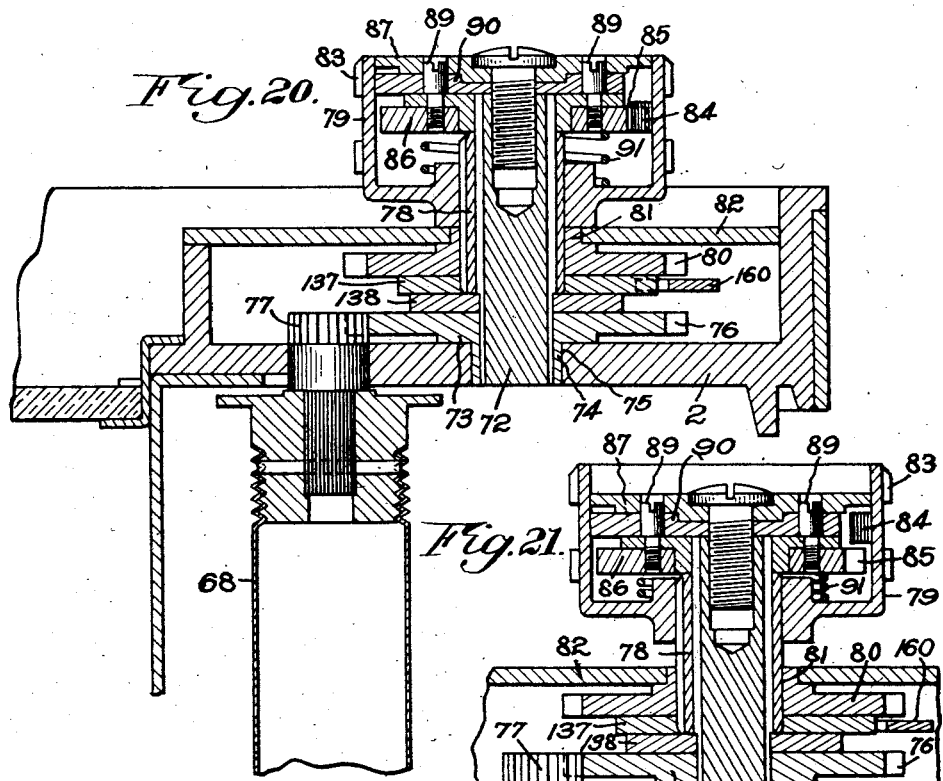
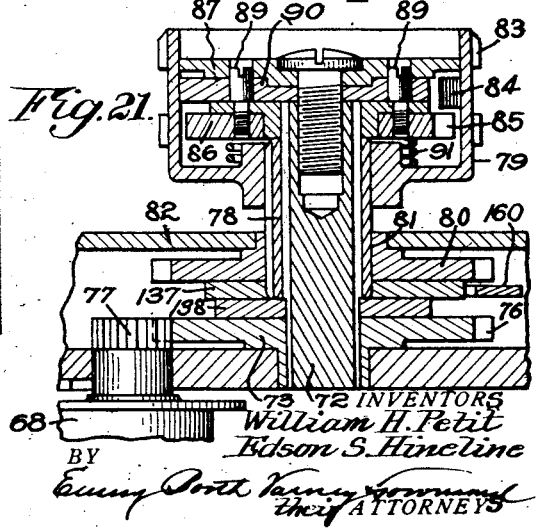

Nov. 13, 1934.  W. H. PETIT ET AL  1,980,546
PHOTOGRAPHIC CAMERA
Filed March 29, 1933   18 Sheets-Sheet 11
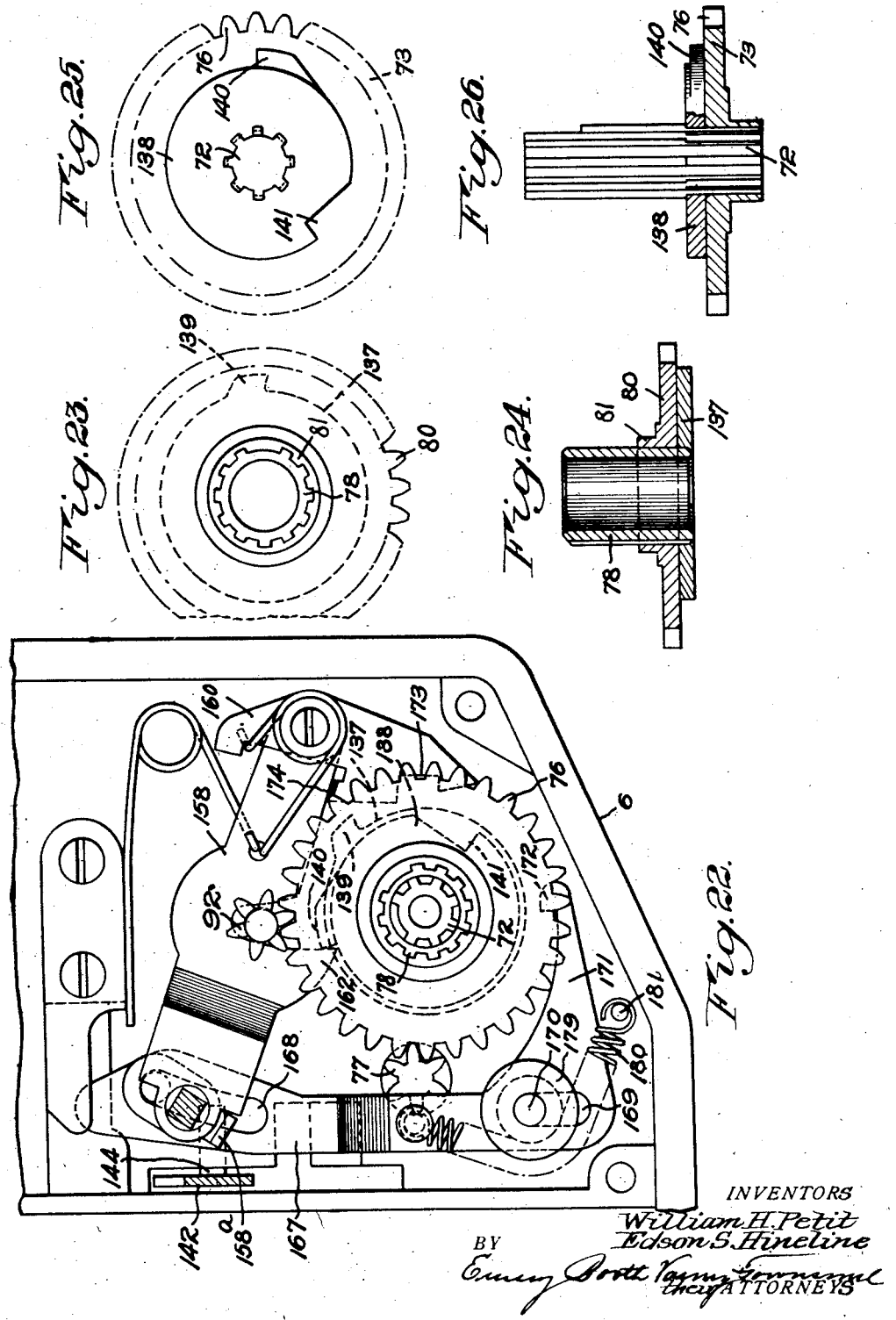
INVENTORS
William H. Petit
Edson S. Hineline
BY
their ATTORNEYS Nov. 13, 1934.  W. H. PETIT ET AL  1,980,546
PHOTOGRAPHIC CAMERA
Filed March 29, 1933   18 Sheets-Sheet 12

INVENTORS
William H. Petit
Edson S. Hincline
BY
their ATTORNEYS

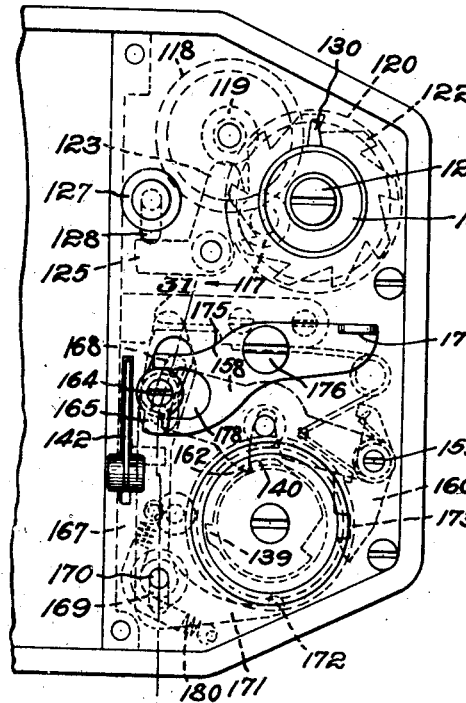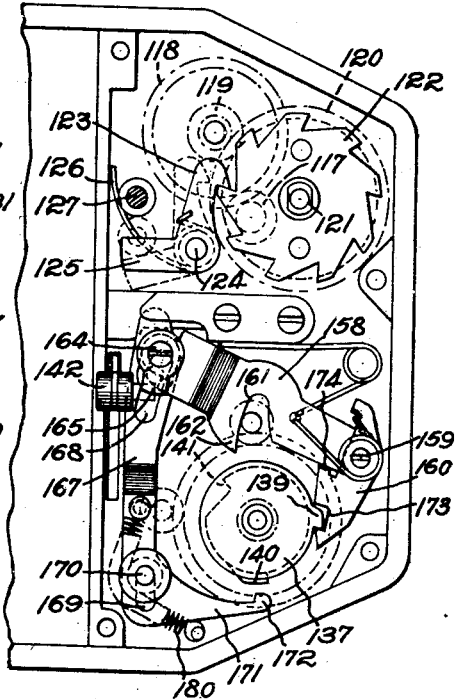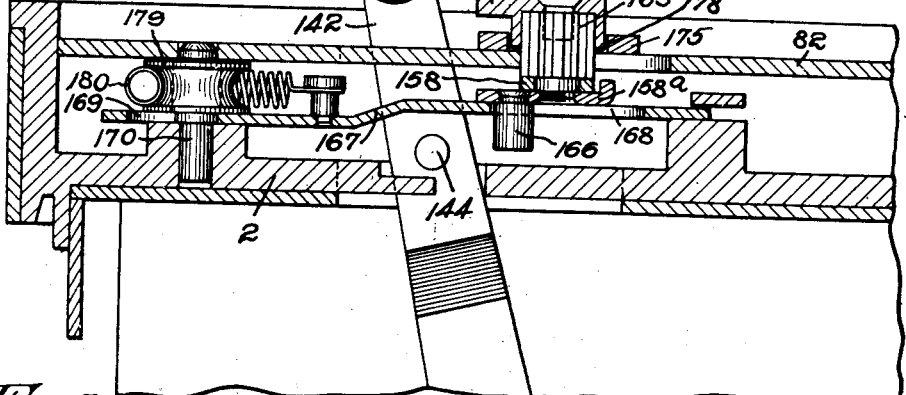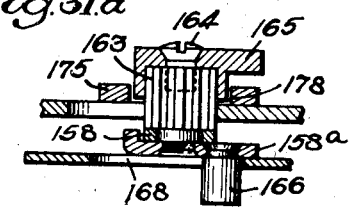

Nov. 13, 1934.       W. H. PETIT ET AL       1,980,546
PHOTOGRAPHIC CAMERA
Filed March 29, 1933       18 Sheets-Sheet 14
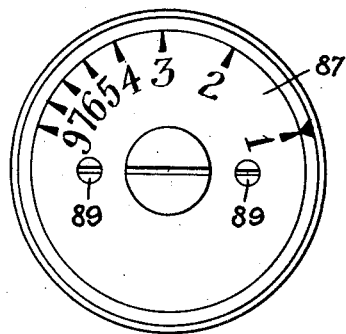
Fig.32.
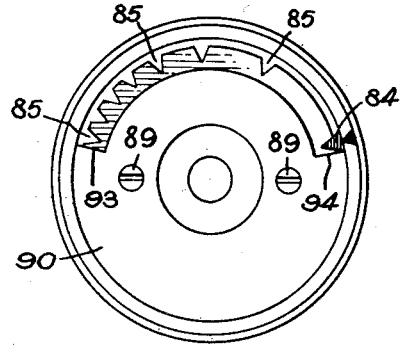
Fig.32a.
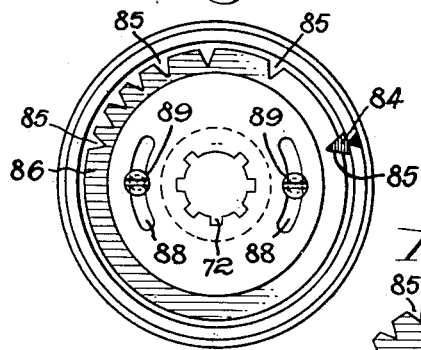
Fig.33.
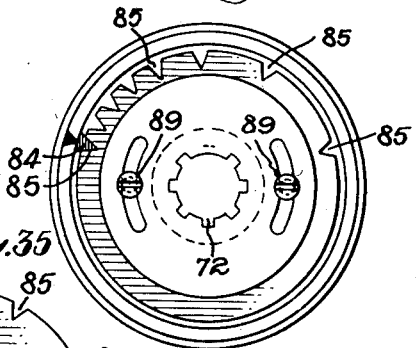
Fig.34.
Fig.35.
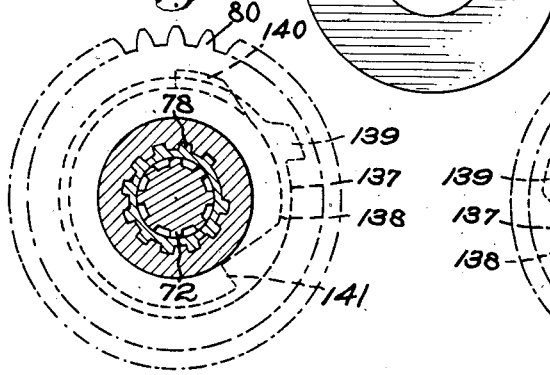
Fig.36.
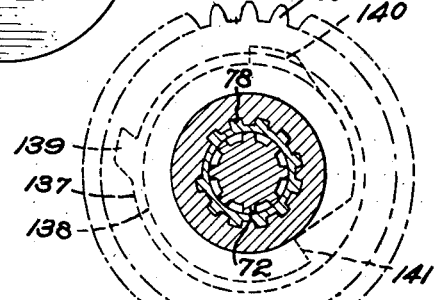
Fig.37.
INVENTORS
William H. Petit
Edson S. Hineline
BY
Their ATTORNEYS Nov. 13, 1934.  W. H. PETIT ET AL  1,980,546
PHOTOGRAPHIC CAMERA
Filed March 29, 1933   18 Sheets-Sheet 15
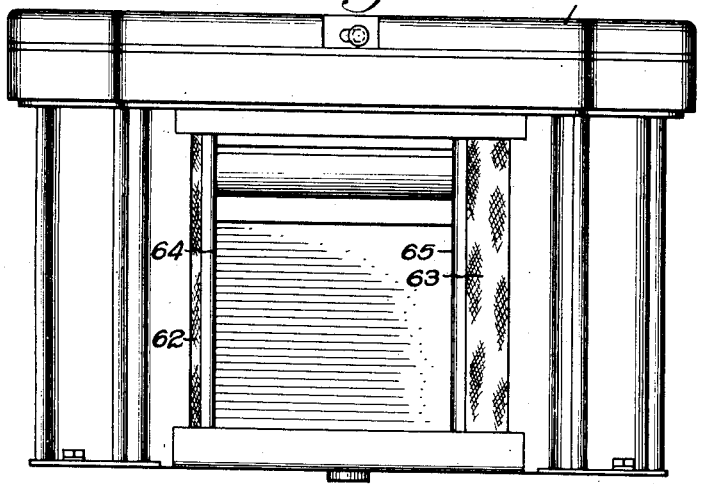
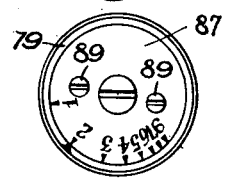
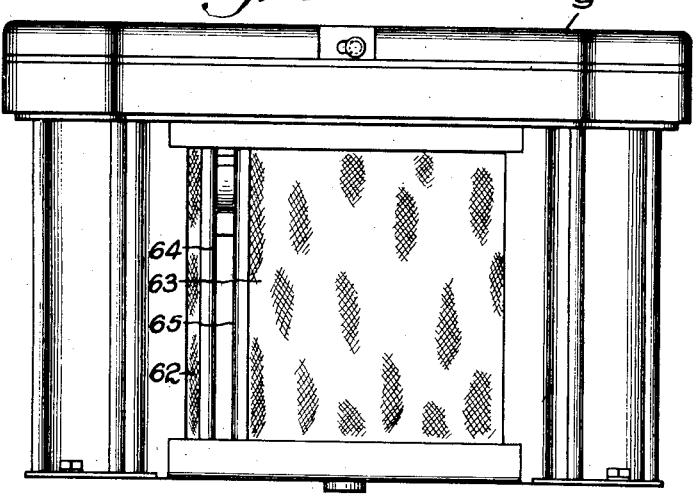
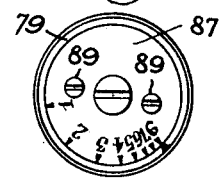
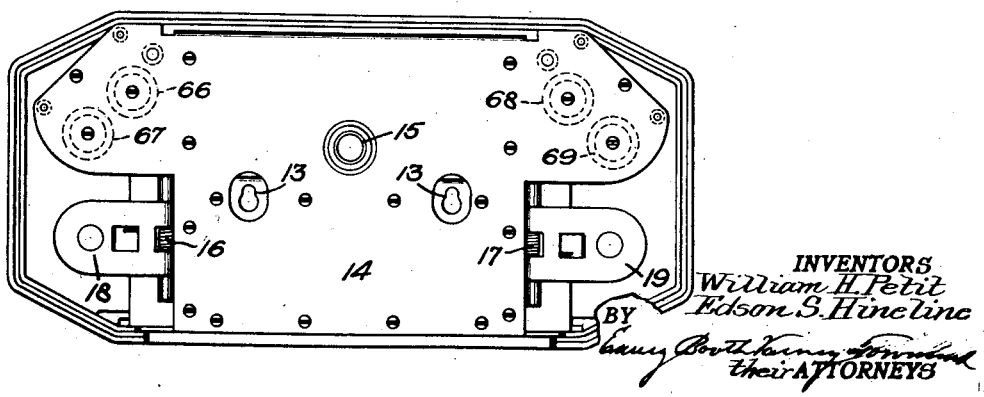

Nov. 13, 1934.                W. H. PETIT ET AL                1,980,546
                               PHOTOGRAPHIC CAMERA
                          Filed March 29, 1933        18 Sheets-Sheet 16
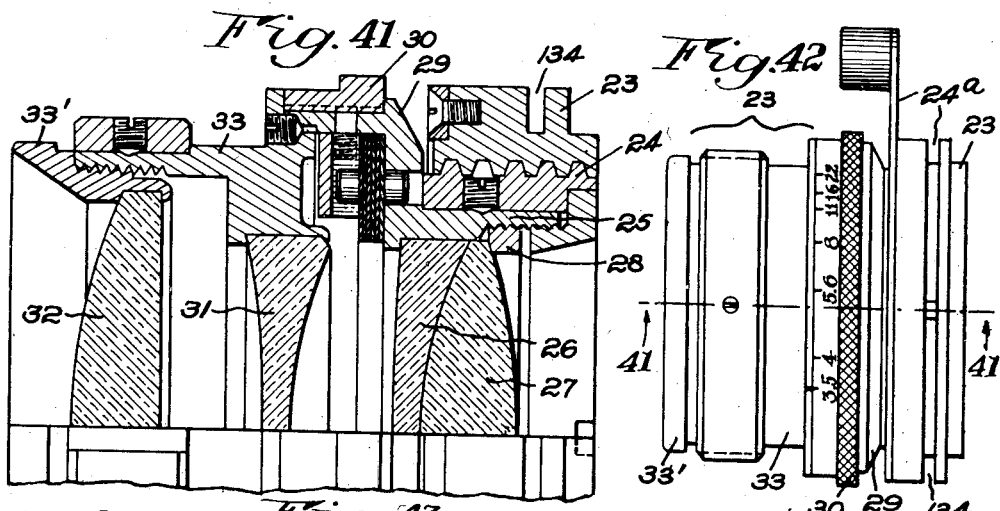
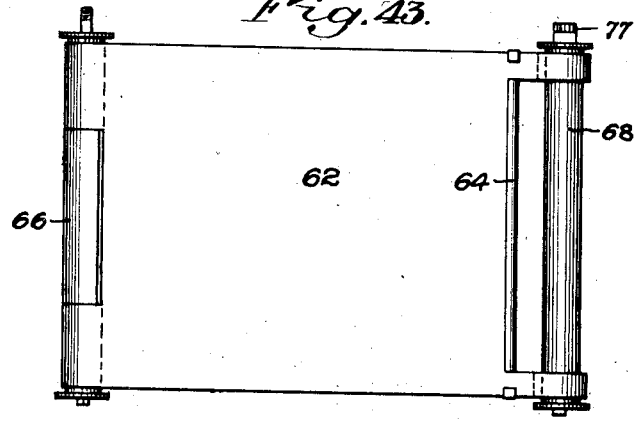
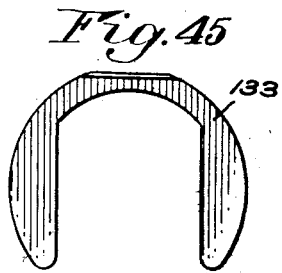
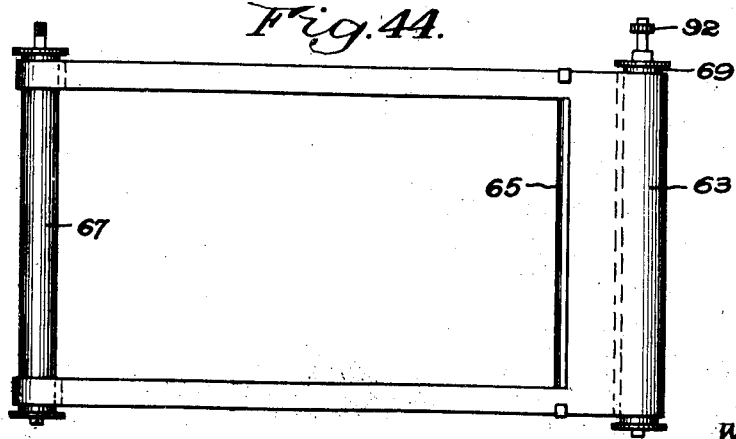
INVENTORS
William H. Petit
Edson S. Hinetine
BY
ATTORNEY Nov. 13, 1934.  W. H. PETIT ET AL  1,980,546
PHOTOGRAPHIC CAMERA
Filed March 29, 1933   18 Sheets-Sheet 17

Fig. 46

| TIME OF DAY | A.M. | 9 | 10 | 11 | 12 | | NOV. | DEC. | SET THIS SLIDER TO THE TIME OF DAY |
|---|---|---|---|---|---|---|---|---|---|
| | P.M. | 3 | 2 | 1 | | | JAN. | FEB. | OPPOSITE THE MONTH GROUP. |
| | A.M. | 7 | 8 | 9 | 10 | 11 | MAR. | APR. | FIND SPEED NUMBER UNDER THE 'F.' |
| | P.M. | 5 | 4 | 3 | 2 | 1 | SEP. | OCT. | NUMBER SELECTED-OPPOSITE THE |
| | A.M. | | 6 | 7 | 8 | 9 | 10 | MAY | JUNE | DESCRIPTION OF THE PICTURE AND |
| | P.M. | 6 | 5 | 4 | 3 | 2 | | JULY | AUG. | LIGHT CONDITION. |

DESCRIPTION OF PICTURE | F. NO. 22 16 11 8 5.6 4 3.5

FIGURES IN DEEP SHADE OR DARK STREETS. VIEWS IN SHADY WOODS. DARK OBJECTS-BUILDINGS ALSO SUBJECTS NEARER THAN 5 FEET — DULL / HAZY / BRIGHT

PORTRAITS OUTDOORS IN SHADE OR WITH DARK BACKGROUND. LIGHT BUILDINGS. OPEN STREETS. LANDSCAPES WITH DARK TREES — DULL / HAZY / BRIGHT

VIEWS, GROUPS, LARGE FIGURES IN OPEN. SNOW SCENES WITH DARK FIGURES. LANDSCAPES WITH LIGHT FOREGROUND — DULL / HAZY / BRIGHT

SEMI DISTANT VIEWS IN THE OPEN. NEARBY VIEWS ON WATER OR WHITE SAND. DISTANT DARK MOUNTAINS OR FORESTS. — DULL / HAZY / BRIGHT

DISTANT VIEWS, LIGHT MOUNTAINS. SNOW SCENES, OPEN BEACH & SAND. (FOR OPEN WATER & SKY ADD 1) SEE TABLES FOR MOVING OBJECTS — DULL / HAZY / BRIGHT

INVENTORS
William H. Petit
Wilson S. Hineline
BY
THEIR ATTORNEYS

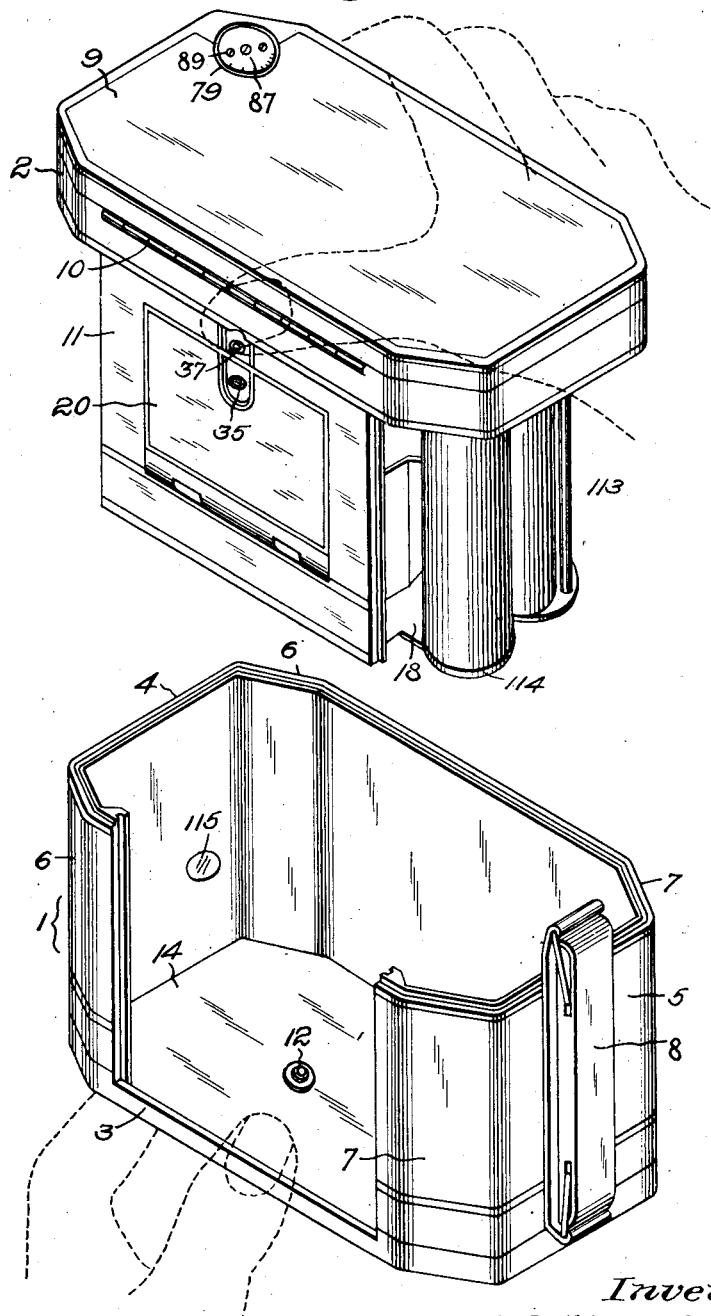

Patented Nov. 13, 1934

1,980,546

UNITED STATES PATENT OFFICE 1,980,546

PHOTOGRAPHIC CAMERA

William H. Petit and Edson S. Hineline, Rochester, N. Y., assignors to Folmer Graflex Corporation, Rochester, N. Y., a corporation of Delaware Application March 29, 1933, Serial No. 663,326

46 Claims. (Cl. 95—42)

This invention relates to photographic cameras, and more particularly to cameras all of the parts of which are arranged very compactly and within a small compass.

In order that the principle of the invention may be readily understood, we have disclosed a single embodiment thereof in the accompanying drawings, wherein—

Fig. 1 is a front elevation of the camera with the top opened up and the viewing hood in functioning position, the lens door being open;

Fig. 2 is an end elevation of the camera with the parts in the same position as in Fig. 1;

Fig. 3 is a vertical transverse section upon an enlarged scale on the broken line 3—3 of Fig. 1, certain of the parts being broken away;

Fig. 5 is a vertical transverse section of the construction shown in Fig. 4 on the irregular dotted line 5—5 of Fig. 4;

Fig. 6 is a vertical longitudinal section of the camera upon the dotted line 6—6 of Fig. 4;

Fig. 7 is a front elevation of the camera in closed position;

Fig. 8 is a bottom plan view thereof;

Fig. 9 is a top plan view of a part only of the camera casing and showing the shutter setting knob;

Fig. 10 is a partial end elevation of the camera casing and showing the film window;

Fig. 19 is a detail in vertical section on the line 19—19 of Fig. 4, showing the curtain rollers, the shutter operating mechanism and film measuring mechanism;

Fig. 20 is a detail in vertical section upon an enlarged scale taken through the shutter setting gears shown in fixed position;

Fig. 21 is a similar view but showing the knob for the shutter setting gears in released position;

Fig. 23 is a detail of the movable curtain gear and cam showing the relationship of the parts;

Fig. 24 is a vertical cross section of the construction shown in Fig. 23;

Fig. 25 is a view similar to Fig. 23 of the fixed curtain gear and cam;

Fig. 26 is a vertical section thereof;

Fig. 27 is a plan view of the shutter operating mechanism in partly wound condition;

Fig. 29 is a plan view of one end of the camera, but looking through the cover and showing the shutter operating mechanism and the film feed mechanism;

Fig. 30 is a view similar to Fig. 29, the cover being removed and the parts being in a different position from that of Fig. 29;

Figure 4:
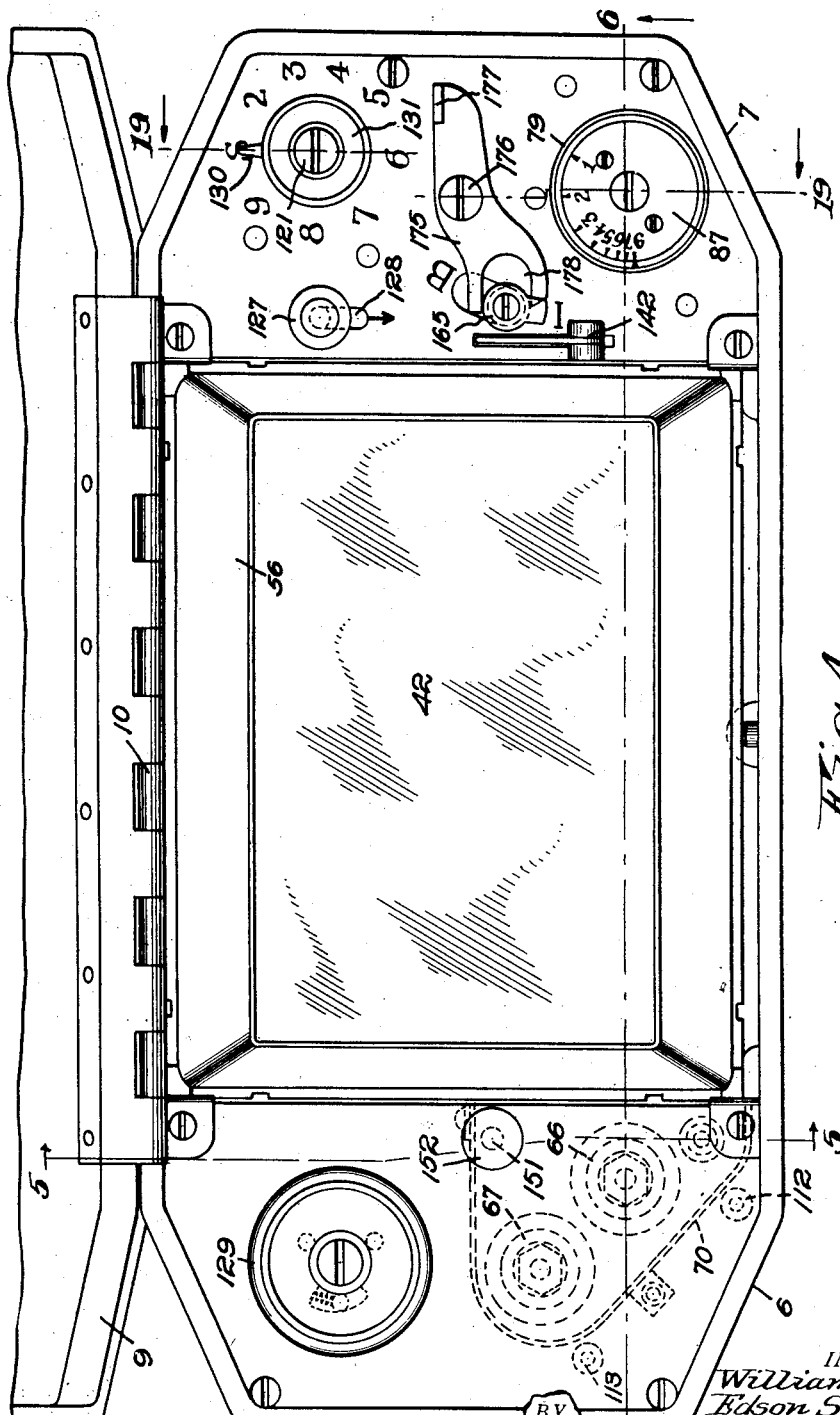
Fig. 4 is a top plan view also upon an enlarged scale of the camera with the cover open.

Fig. 31 is a vertical transverse section upon an enlarged scale to show the mirror operating lever 142 and the shutter release pin 166 in instantaneous position, the view being taken upon the irregular dotted line 31—31 of Fig. 29;

Fig. 31a is a view of the shutter release pin in bulb position;

Fig. 32 is a top view of the shutter winding knob with an index plate, the setting being at position No. 1;

Fig. 32a is a similar view with the index plate removed to show the relation of parts;

Fig. 33 is a similar view showing the parts with the index plate and the stop plate removed;

Fig. 34 is a similar view but with a different setting;

Fig. 35 is a plan view of the notched plate governing the shutter setting;

Fig. 36 is a similar view of adjacent cooperating parts, the shutter operating knob being removed, to indicate the relative position of the cams at the same setting as in Fig. 32;

Fig. 37 is a view similar to Fig. 36 but with the same setting as in Fig. 34;

Fig. 38 is a rear elevation of the camera with the case removed showing the position of the curtain setting when the curtain operating knob is at position No. 2 indicated in Fig. 38a;

Fig. 38a is a detail to indicate one position of the curtain operating knob;

Fig. 39 is a view similar to Fig. 38 when the curtain operating knob is set at position No. 9, as in Fig. 39a;

Fig. 39a is a view similar to Fig. 38a showing the curtain operating knob at position No. 9;

Fig. 40 is a bottom plan view of the camera with the case removed;

Fig. 41 is a detail in cross section of the lens mounting in part;

Fig. 42 is a top elevation or plan view of the lens mounting;

Fig. 43 is a plan view of the fixed curtain;

Fig. 44 is a similar view of the movable curtain;

Fig. 45 is a detail showing the lens lock open ring or sliding member;

Fig. 46 is a plan view of the shutter speed chart;

Fig. 46a is a vertical section upon the line 46a of Fig. 46;

Figs. 47 and 48 are plan views of the two members of the shutter speed chart, and Fig. 49 is a perspective view showing the two part casing, the parts being separated from each other.

This invention, relating as it does to photographic cameras of a very compact type, is intended to render as simple as possible the art of picture-making while providing means to obtain a correct exposure. To effect this result a number of different factors enter into the problem and in order to solve the problem correctly, it has been necessary to co-relate the various elements or factors of the camera in such a manner that while preserving all the efficiency of a camera of large bulk and considerable weight, the camera has been reduced to a relatively small compass and relatively small weight. This has been done without sacrificing in any respect the efficiency and accurateness of the large camera to which we have referred and which is known upon the market as the "Graflex" camera. The novel features of the invention will be evident from the detailed description of the parts as shown in the drawings. We will specifically describe the preferred embodiment of the invention without, however, limiting the invention excepting as set forth in the claims.

Figure 11:
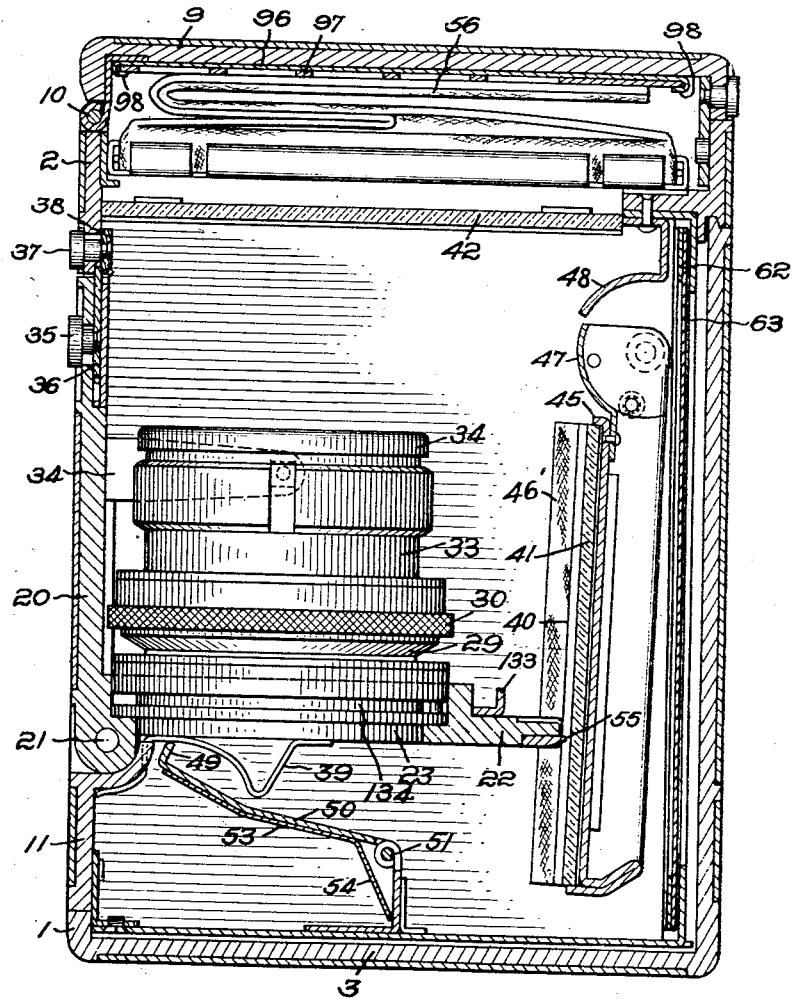
Fig. 11 is a vertical transverse section taken through the camera with the parts in closed position upon the line 11—11 of Fig. 7.
Figure 12:
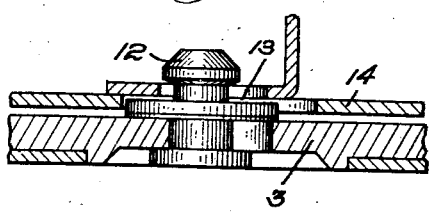
Fig. 12 is a detail in cross section showing the camera lock in released position.
Figure 13:
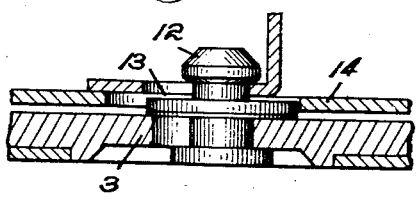
Fig. 13 is a similar view showing the camera lock in locked position.

Referring more particularly to the drawings, the camera casing is made up of two main members, the first of which is indicated generally at 1 in Figs. 5, 11 and elsewhere, and the other of which is indicated at 2 in the same figures. The casing member 1 comprises the bottom 3, the two ends 4, 5, and the end portions of the front, most clearly indicated at 6 and 7 in Figs. 7 and 8. To the end member 5 is secured the strap handle 8. The member 2 comprises all the remainder of the casing and to it are attached all the parts of the camera. To said member 2 is hinged the cover 9, as indicated at 10 in Figs. 5 and 11. Said casing member 2 also includes the front wall 11 of the camera between the inwardly extending ends 6, 7 of the member 1 of the casing. Said front wall is most clearly shown in Figs. 5, 7 and 11. In order to permit the ready separation of the two members 1 and 2 of the casing, there are provided at the bottom 3 two locking studs or buttons 12, 12, one of which is shown in unlocked position in Fig. 12 and in locked position in Fig. 13. The said studs or buttons 12 are adapted to be slid in lengthwise slots 13 in the bottom 3 so as to permit them to engage or disengage the edges of slots 13, 13, in the metal bottom 14 of the member 2 of the casing as is clearly shown in Fig. 40, which figure is, as previously stated, a bottom plan view of the member 2 of the casing after the member 1 has been separated therefrom. Said bottom member 14 is provided with an opening 15 for a tripod and hingedly secured at 16, 17 are two thin metal plates 18, 19 with holes to receive the ends of the spools for the film.

An important feature of the invention resides in the mounting of the lens structure upon the door that is pivoted in the casing member 2 and forms a part of the front wall of the member 2 when the camera is in an entirely closed position. The structure and arrangement are such that when the door carrying the lens is swung inward it engages the mirror structure or mounting so as to swing it from its focusing position at a forty-five degree angle into a vertical position and at the same time to swing downwardly the member that holds said mirror at its said forty-five degree focusing position. This exceedingly compact arrangement (which we will next describe) is such as to permit the assembling of all necessary parts in a small compass while retaining all the advantages of the much larger Graflex camera. We will now describe the details of construction of the lens mounting and the mirror mounting and their cooperation in opening and closing the camera.

Referring particularly to Figs. 3, 5, 11, 41 and 42, it will be understood that in the front wall 11 of the casing member 2, there is provided the door 20 hinged at 21. Said door 20 in reality consists of two main parts at right angles to each other, the main part 20 constituting the door and the right angled part 22 rigid with the part 20 constituting the support for the lens mounting and constituting also the means for swinging the mirror from inclined to vertical position.

Referring first to the details of the lens mounting, the plate or part 22 receives the threaded ring 23. The parts of the lens structure may be and desirably are of usual construction and it is unnecessary to describe it in great detail. It is sufficient to state that the ring 23 has threaded thereinto the inner ring or barrel member 24 within which is positioned the lens barrel 25. The two rear lenses are indicated at 26 and 27. They are positioned within the lens barrel 25 and held in position by the ring 28 threaded into the lens barrel 25. In advance or to the left of the ring 23 there is a barrel or ring-like member 29 and the diaphragm ring 30, and in advance thereof are the front lenses 31, 32 suitably supported in the lens barrels 33, 33'. The door 20 is provided with two brackets 34, shown most clearly in Figs. 1 and 11. They are provided with inwardly extending pins to engage the front lens barrel mounting so as to hold said mounting from rotative movement when the lens barrel is being manipulated or adjusted for focusing by the threaded part 24 and lever 24a in Fig. 42.

As shown most clearly in Fig. 11, there are provided two buttons or headed pins for unlatching the door 20 and for latching the same respectively. The pin 35 is secured to a sliding plate 36, the upper end of which engages the frame just above the door, so that by moving the pin 35 downward the spring which surrounds the pivot 21 instantly swings the door downward from the closed position into the open position shown in Fig. 3. The pin or button 37 carries a small inner plate 38 which in the position shown in Fig. 11 engages the plate 36 on the inner wall of the door 20. In order to permit the door 20 to be closed, the pin or button 38 is pressed upward by the thumb or finger, thus permitting the door 20 to be swung inward. Said door will be held in its closed position by the plate 36 carried by the pin 35.

Figure 14:
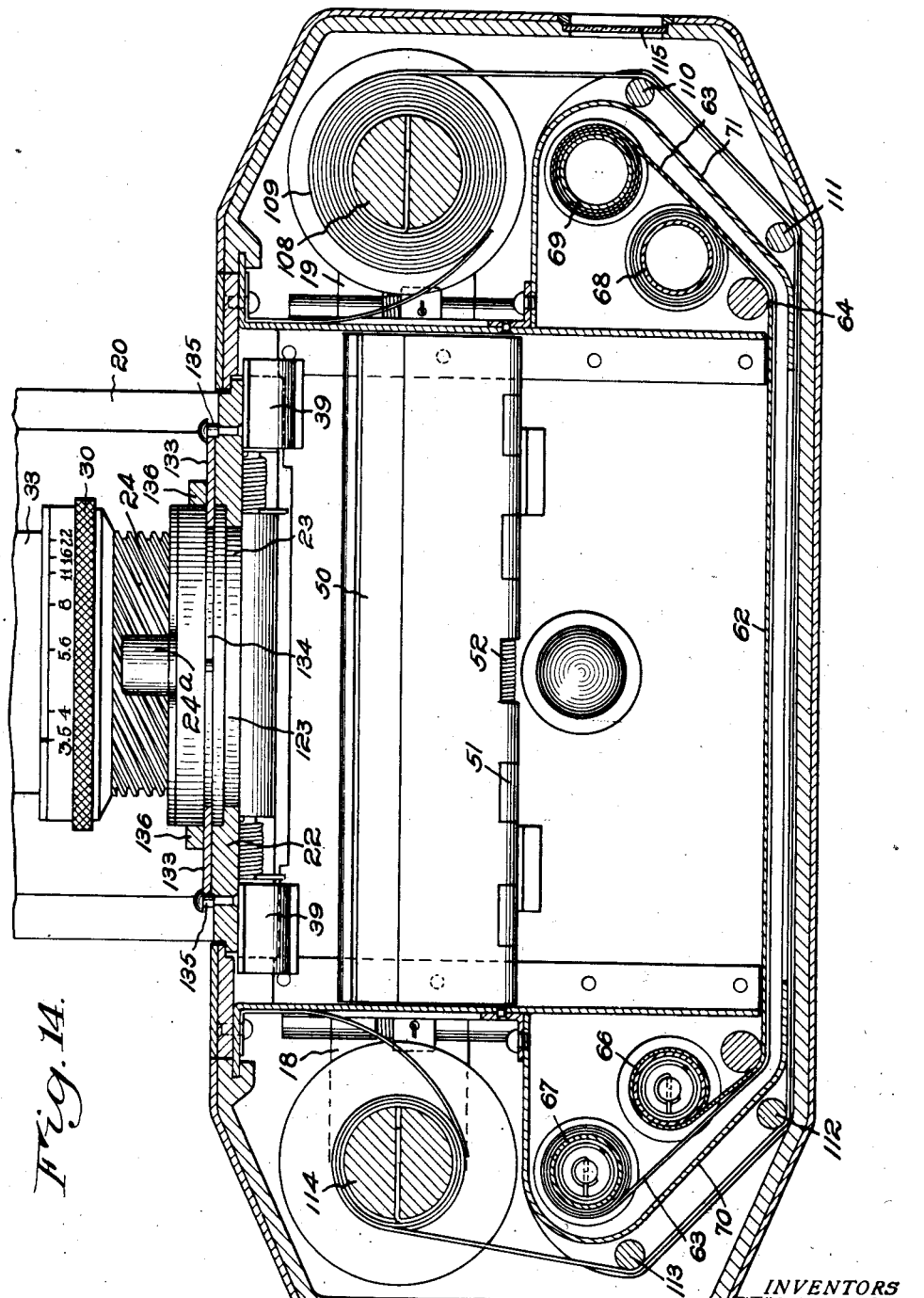
Fig. 14 is a horizontal longitudinal section taken through the entire camera but upon an irregular line so as to show the parts more plainly.

At the under side of the right angled part 22 of the door 20, there are provided two brackets 39, one of which is shown in each of Figs. 3 and 11 and both of which are shown in Figs. 6 and 14. The said brackets are so positioned and are of such extent that as the door 20 is swung inwardly, said brackets 39 impinge upon the plates or thin pieces of metal 40 which overlie the opposite edges of the mirror 41. Said mirror 41 may be of the usual construction employed in the Graflex cameras or of any suitable construction, and is so positioned that the image received through the lenses is reflected onto the ground glass 42 mounted in the top of the casing member 2 beneath the cover 9 that is pivoted at 10 upon said member 2 of the casing.

Referring to the details of mounting of the mirror 41, the same is supported in a frame 45 that is hinged at its opposite upper corners or ends at 46 in the casing, the frame 45 having a light guard 46'. There is also provided a double guard 47, 48, the members of which are in wiping contact at all times. The mirror is normally spring pressed outward, that is, toward a horizontal or picture-taking position, but as it swings outward the edge of its frame is engaged by the bent over end 49 of the plate 50 hinged at 51 in the casing and there provided with a coiled spring 52 which tends to throw the said plate 50 upward into the position shown in Fig. 3. Secured to the under face of the plate 50 is a fabric guard 53 having a depending portion 54 to exclude light.

When the door 20 is swung inwardly from the position shown in Fig. 3, the brackets 39 engage the frame of the mirror 41 and swing the same inward, and in the continued movement of the parts the brackets 39 engage the plate 50 with its bent over end 49 so as to depress said plate 50 into the position shown in Fig. 11, the edge 55 of the door member 22 engaging with the frame of the mirror 41 as indicated in Fig. 11. The said parts thus remain in their tightly compacted position until the camera is to be used. The means for moving the mirror up into the horizontal position will be described at a later point.

Directly above the ground glass 42 and below the cover 43 is supported the hood 56 which, as shown in Fig. 11, is adapted to be folded down into compacted position by the closing of the cover. As the cover is opened, the hood automatically springs into open or viewing position. Said hood is or may be of usual construction but has the additional feature of a microscope or magnifying glass 57 shown in full lines in Fig. 3, and in the same figure is indicated in dotted lines as the position when the microscope is to be used. The said microscope is carried by a metallic strip 58 that is pivoted at 59, there being a short end of said strip 60 extending through an opening in the hood so that by engaging it with a finger nail the microscope may be swung from the full line position into the dotted line position. This permits the central part of the object to be focused with greater accuracy. The hood is shown as having a metallic strip 61 secured to its outer face to support the strip 58 for the microscope 57.

We will next describe the curtain structure. This is best shown as to the general structure thereof in Figs. 14, 43 and 44.

We provide two curtains, namely, an inner or fixed curtain 62 and an outer or so-called movable curtain 63, together constituting a composite curtain. Both curtains, of course, move in the curtain winding action and in the act of making the exposure, but the curtain 62 is termed the fixed curtain because the edge 64 thereof, shown in Fig. 43 and also indicated in Fig. 14, is the edge with respect to which the edge 65 of the other curtain is moved so as to increase or diminish the size of the aperture between said two edges of the curtains. The inner or fixed curtain 62 is mounted upon a spool 66 shown at the left in Fig. 14, which spool is provided with an inner coiled spring that tends at all times to draw said inner curtain 62 taut by winding the same upon the spool 66. The outer curtain 63 is wound upon the spool 67 which is similarly provided with an inner coiled spring that tends to keep said outer curtain tightly wound upon the spool.

At one end the inner curtain 62 is wound upon the spool 68, and at its other end the said outer curtain 63 is wound upon the spool 69. The spools 66, 67, 68, 69 are positioned in pairs within suitable metallic housings 70, 71 at opposite ends of the camera casing.

The means for winding the outer curtain 63 to adjust or vary the size of the curtain opening of the composite structure are best shown in Figs. 19, 20 and 21, reference also being made to Figs. 4, 38a and 39a as well as to Figs. 22 to 26. Upon the right hand end of the upper part of the casing member 2, but below the cover 82, viewing Fig. 4, there is mounted a short vertical shaft 72 that has splined on its lower end a gear 73 having a hub portion 74 that has bearing in an opening 75 in the said upper part of the casing member 2. The said gear 73 has teeth 76 meshing with a pinion 77 upon the spool 68 for the inner curtain. The said shaft 72 is surrounded by a short tubular shaft 78 also provided with a spline and upon which is mounted in upright position a cup-like member 79. Above the gear 73 is a second gear 80, the hub 81 of which is received in the transverse upper plate 82 of the upper frame structure, so that the splined shaft 72 is firmly supported for rotative movement. Between the gears 73 and 80 are parts to be hereinafter referred to.

The cup-like member or shutter winding knob 79 is knurled as indicated at 83. Upon its inner surface it is provided with a wedge-like piece or point 84, indicated also in Figs. 32, 33 and 34, which point is adapted to be engaged by any one of a series of notches 85 that are in a notched plate 86, separately shown in Fig. 35. These notches are eight in number, as shown by the numbers 1 to 7 and 9 (see Figs. 4 and 32) upon the index plate 87 shown most clearly in Fig. 32. When the cup-like member or shutter winding knob 79 is in the position shown in Fig. 20, the point 84 is in engagement with one of the notches 85 numbered 1 to 9, which numbers, it will be understood, indicate the size of the opening between the vertical edges of the composite or two-part curtain structure. No. 1 indicates the largest size of curtain opening, and the others are progressively narrower in transverse extent, as will be well understood.

The said disk 86 is adapted to be circumferentially adjusted by means of slots 88 and screws 89 so as to get a very accurate positioning of the parts. The said screws 89 extend upwardly through holes in a disk 90 and into holes in the dial plate 87. A coiled spring 91 is employed that tends to move the shutter winding knob into its lower position shown in Fig. 20.

When the parts are in the position shown in Fig. 20, the disk 86 being in engagement with the wedge point 84, both gears 76 and 80 are in driving relation with the pinions of the respective curtain rolls 68 and 69. The pinion 77 is in mesh with the gear 73 for driving the roll 68 and the gear 80 meshes with a pinion 92 shown most clearly in Figs. 27 and 28 to drive the curtain roll 69. When the parts are in the position in Fig. 21, the curtains are not locked together, but are in their condition permitting the adjustment of the movable curtain with respect to the so-called fixed curtain, so that the size of the exposure opening in the composite curtain may be observed. When such adjustment has been made, the parts are restored to the position shown in Fig. 20 whereafter the two curtains operate as a single composite curtain.

In Fig. 32a is shown in plan the disk 90 which is provided with shoulders 93, 94 to prevent the overrunning in either direction of the parts in setting the point 84 with respect to the figures on the dial plate 87.

Before describing the details of means for winding the curtain and for releasing the same when the exposure is to be made, we will refer to another important feature of our invention that involves an entirely new method or arrangement for determining the proper setting. The purpose in providing such arrangement or method of control is to enable this camera to be used with extreme accuracy by persons having but very little knowledge of photography. To make this method of operation entirely clear, it will be necessary briefly to refer to what has been the prior practice in the use of cameras by those not having a great knowledge of photography.

Heretofore in determining or adjusting the shutter speed, it has been the practice to indicate the several shutter speeds in fractions of a second. This has been rather hard to grasp or to work out under all conditions. We have substituted for the common marks heretofore provided of shutter speeds (which marks were usually indicated in fractions) a series of whole numbers which have a definite relation to each other and to the exposure time. These numbers are provided upon a chart indicated in Figs. 46 to 48 at 95 in its entirety. Such chart is composed of the underlying, preferably metallic, plate 96 and the overlying narrower plate 97 adapted to slide within the turned over edges 98 of the base plate. The said two plates are preferably mounted upon the under side of the cover 9, as indicated in Fig. 5.

The plate 96 is marked as follows: At its upper part following the legend "Time of Day", at 99, it is marked for the hours of the forenoon and afternoon in three horizontal rows which are in horizontal alignment with the notations 100 for the month groupings on the overlying slide plate 97. The co-action of these two features will be presently explained.

Upon the said underlying plate 96 below the designation for the "Time of Day", there appears at 101 a detailed description of five different types of pictures, which together include substantially all the types of pictures that would be taken by the user of the camera. In addition to such notations, all of which are at the left hand side of the plate 96, the said plate is, at the right hand side thereof as shown in Fig. 47, provided with groups 102 of whole numbers (avoiding fractions), which numbers correspond to the numbers upon the dial plate 87, as shown in Fig. 32 and also in Fig. 4. The said numbers are arranged in the five groups 102 corresponding in transverse alignment with the description of the five types of pictures.

Upon the overlying plate 97, there are provided at the top at 103 brief instructions for operating the sliding member of the guide. At the left of said instructions the months of the year are arranged in the three groups 100 of four months each previously referred to. Each group of four months is so positioned, as at 104, to indicate its relation to the numbers for the time of day for those months. Below the said notations appears, at 105, the F system of numbering diaphragm openings which is well known and which needs no further explanation. Below the said indications for the diaphragm openings appear a series of openings 106, being arranged in five horizontal rows, each horizontal row consisting of six openings. At the left of said series of openings appear the designations "Dull", "Hazy", "Bright", which designations are in transverse alignment with such numbers as may appear either at the top or the bottom or at midlength of any one opening.

Having made this general description of the structure of the chart, it will be understood that the condition of the light being one that is evident to the judgment of the user of the camera, and the month of the year, the time of day and the particular type of picture to be made being known factors, the chart will, when set, give the correct position for setting the shutter. So far as we are aware, this is the first time that an arrangement of this type has been built into a camera structure, so as to enable anyone with practically no photographic knowledge to take exceedingly good pictures.

The whole numbers that are used, namely, from 1 to 7 inclusive and 9, as already explained in detail, represent different shutter or curtain openings. The F numbers as stated represent the diaphragm openings. The figures following "Time of Day" represent the various hours of the day at which pictures would usually be taken, and obviously a picture taken, for example, shortly before or shortly after 9 A. M. would be treated as one taken at 9 A. M., etc. throughout the hours of the day. The various months of the year have, as stated, been grouped together, and this is done because of the different light conditions found in said several groups of months.

In order to give one or two examples of the use of the chart, it will be presumed that a portrait is to be made out of doors in the shade. Therefore, the second group of conditions under "Description of Picture" would control. It will be assumed that the day is bright, the time is 11 A. M., and the month is March. Under such conditions the photographer with a mere smattering of photographic knowledge would know that he should use a large diaphragm opening. It will be assumed that he would use a large diaphragm opening such as F4. Therefore, the slide 97 is moved until its left hand edge brings the month of March opposite the time 11 A. M. Referring then to the indication for the large opening F4 and following down the line of exposed numbers in the vertical row under F4, it will be found that in the second type of picture "Outdoors in shade" the whole number "9" appears opposite the word "Bright". This number is therefore the proper number to be used for setting the shutter. This number "9" is the number 9 which is shown on the dial plate 87 of Fig. 32. It will be seen that in the same group of figures, there are the three light conditions indicated, namely, No. 5 for a dull day, and No. 7 for a hazy day. Therefore the Nos. 5, 7 and 9 would be the proper numbers to use with the F4 opening of the diaphragm depending upon whether the day is dull or hazy or bright.

Another example of the use of the chart is as follows: If it were decided to use a smaller diaphragm opening so as to obtain greater depth in the picture (that is, a greater depth of focus of the near and far objects as well as the central ones), it is of course necessary to "stop" or adjust the lens down to a smaller opening, which in this particular camera can readily be determined by viewing the object to be photographed on the ground glass screen 42. When the diaphragm has been moved into such a position that the depth of the picture is satisfactory to the camera user, he then reads the diaphragm number, shown in Fig. 42 at 105 (which is the same number as given for the diaphragm opening on Fig. 46), and it will be assumed that the opening F8 is selected. The user therefore follows down the column under No. 8 in Fig. 46, which in the previous instance was given as "Portrait outdoors". It will be found that the correct numbers for setting the shutter corresponding to dull or hazy or bright would be 1, 3, 5 respectively, for such type of picture.

It will be understood that, referring to Fig. 46, with the diaphragm opening F16, one half the time for exposure is required as for diaphragm opening F22. Diaphragm opening F11 requires one half the time for opening 16; opening No. 8 one half the time for opening 11, etc. It will be noted that the numbers have been so arranged in Fig. 47 that each second number in any horizontal row cuts the exposure time in two; that is, assuming that No. 1 in the first horizontal row would represent 1/25 of a second, No. 3 in the same row would represent 1/50 of a second, etc. In the third row (Fig. 47) we find that No. 5 would represent 1/100 of a second, and No. 6 would represent 1/150 of a second.

Continuing this explanation and taking, for example, the second horizontal row of figures in Fig. 47, if No. 1 should represent 1/25 of a second, No. 2 would be 1/37 of a second, No. 3, being the second number removed, would be one half the exposure of No. 1, namely 1/50 of a second. Advancing to No. 4, it appears that the time exposure is decreased to 1/75 of a second, and advancing again from No. 3 to No. 5, the speed of the exposure is doubled from 1/50 to 1/100. No. 6, in turn, being two numbers removed from No. 4, would correspond to one half the exposure of No. 4, namely, 1/150 of a second. Taking, for example, the sixth horizontal row in Fig. 47, if the numeral indicates a shutter opening of 1/30 of a second, the time for the successively higher numbers would be less, as follows:

No. 2 ------------------------------------ 1/45
3 -------------------------------------- 1/60
4 -------------------------------------- 1/90
5 -------------------------------------- 1/120
6 -------------------------------------- 1/180
7 -------------------------------------- 1/240
9 -------------------------------------- 1/480

It will be understood that the numbers in Fig. 47 are arranged in such a way that any number in any row indicates one half the time of exposure of the second number to the left in the same row, and this is true of every number from which a start is made.

No. 8 is omitted merely because there is not sufficient room convenient therefor on the disk 87 (Fig. 32).

Referring again to the manipulation of the upper chart plate or member 97, it was assumed in the first description that the picture is to be taken at 11 A. M. in the month of March. In that case the member 97 is slid as previously stated to the left until the edge of the member comes to No. 11 with the name of the month March in horizontal alignment with No. 11.

If the picture were to be taken at 11 A. M. in December, then the upper plate or member 97 would be slid further to the left until the time, 11 A. M., would be found in the top horizontal row in horizontal alignment with the month, December.

Whatever be the month and the time of the day when the picture is to be taken, the movement of said upper plate or member 97 exposes various numbers on the underlying plate 96 of the chart. Any exposed number shown in Fig. 47 may be used if it be found in horizontal alignment with the condition of the day and the kind of picture to be taken. The number exposed and which is to be used can only be used with the diaphragm setting indicated in the line F at 105.

Therefore all that the user of the camera has to do to get an absolutely correct setting is to slide the upper plate or member 97 of the chart until the left hand edge thereof comes to the time of day indicated on the lower or under member, with the existing month in line with that time of day. The user then reads along a horizontal line where is a single word that states a condition of the day, that is, dull or hazy or bright. The user selects one of the numbers in line with that word which describes the condition of the day, this being in line with the selected type of picture, as already explained. Then, from that number decided upon, the user reads upwardly from that number to find the diaphragm opening and the user then sets the diaphragm opening to that number which he finds, be it 8, 5.6, or any other diaphragm opening number. Of course, having set the diaphragm opening which, as stated, appears on the periphery of the lens mounting, as shown in Fig. 42, the shutter opening must be set to the same number that was found by manipulating the overlying plate 97 of the chart. In other words, the knob or cup-shaped member 79 is turned until the marker or point on the rim is brought opposite a number exposed and selected by manipulation of the two parts of the chart or guide.

We will next describe the means for loading a film and for moving successive portions thereof into picture-taking position. For this purpose, we refer particularly to Figs. 4, 5, 10, 14, 19, 29, 30 and 40. In Figs. 19 and 40, we have previously described the spring pressed brackets or members 18 and 19 for supporting the two film spools. In Fig. 14 is shown the spool 108 carrying the unexposed film roll 109. Said film is represented as having been positioned for making an exposure. Said film for this particular camera may be of any suitable character, but is desirably the Eastman film No. 120 on which eight pictures have heretofore generally been taken. Said film is adapted in the use of our camera to receive ten pictures or exposures, each exposure area being two and a half inches in length and two and a quarter inches in height, the exposure areas being separated by one quarter of an inch.

The film 109 in the loading or film positioning operation is passed about a series of guide rollers 110, 111, 112, 113, and thence to the take-up spool 114 at the opposite end of the camera casing. In suitable relation to the film, so as to permit the numbers thereon to be observed, is the small red window 115 shown best in Figs. 10 and 14.

Referring next mainly to Figs. 4, 19 and 30, it will be observed that the key 116 for receiving the upper end of the film spool is shown in Fig. 19 as secured to the under side of the top of the casing, and that at its upper end it is provided with a pinion 117 (indicated also in dotted lines in Fig. 30). Said pinion meshes with a gear 118, shown in dotted lines in Fig. 30. The pinion 119 co-axial therewith meshes with the gear 120 mounted upon a shaft 121. Co-axial with said gear 120 is a ratchet 122, the number of teeth being nine to provide for the ten exposures. The teeth are arranged at slightly different circumferential distances to compensate for the decreasing size of the film roll and in order to permit exactly the same length of film to be moved for each exposure.

Mounted adjacent to the ratchet 122 is a pawl 123 pivoted at 124 and provided with a tail 125. A spring 126 normally tends to move said pawl into engagement with the teeth of the ratchet 122.

Upon the end of the casing that supports the nonexposed portion of the film, there is provided a button 127, best shown in Figs. 4, 29 and 30. The said button is mounted in a slot 128, and before any part of the film can be drawn off, it is necessary to move said button 127 downward (as shown in Fig. 4) in the direction of the arrow; that is to say, from front to back looking onto the camera from the top. In such movement of the button 127 it engages the tail 125 of the pawl 123, and thus withdraws said pawl from engagement with a tooth of the ratchet 122. It is then possible to unroll sufficient film to reach the take-up spool 114 which at its upper end is provided with a knurled knob 129, best shown in Fig. 4. The knob 129 is turned until the figure 1 on the film strip appears in the red window 115. When this condition has occurred, the knob 131 carrying the pointer 130 should be lifted against the force of the coil spring 132, shown in Fig. 19, so as to withdraw the gear 120 from the pinion 119. This will allow the knob 131 and pointer, as above referred to, to be turned freely. The knob 131 carrying the gear 120 is then allowed to fall into engagement with the pinion 119, the pointer being over the letter "S". The film is then in position for the first exposure. Subsequent exposures are made as follows: After the exposure is made, the button 127 is moved in the direction of the arrow at the end of slot 128, releasing the film winding lock. The knob 129 can then be turned in a clockwise direction until it stops, at which time the pointer 130 will be pointing at the number "2", as in Fig. 4.

The necessary part of this action is repeated after each exposure.

In order to hold the lens structure on the door 22, we have provided an open lock ring or slidable member 133, shown separately in Fig. 45 and in position in Fig. 14. Said lock ring or slidable member is adapted to be inserted in the groove 134 of the lens mounting and to be slid into place to engage with guide pins 135 (shown in Fig. 14) and beneath the ring-like piece 136 on the door structure.

Referring again to the size of the composite curtain openings and to the pins 89 in the arcuate slot 88 of Figs. 20, 21 and 33, it is to be understood that the adjustment is primarily provided to permit of varying the size of the narrowest opening provided between the two adjacent vertical edges of the two curtains. Having obtained that narrowest opening of the desired width, it is to be understood that the other openings are proportionately greater. If the adjustment for the narrowest opening is made smaller, then the size of the larger openings would be based respectively upon the adjusted or determined size for the narrowest opening.

We will next refer to the means for winding the composite curtain before exposure and for releasing the curtain for instantaneous work or for bulb work. For this purpose, we will refer to Figs. 4, 6, 14, 22 and 27 to 31, it being noted that the curtains themselves, shown in Figs. 43 and 44, have previously been described.

Referring to Fig. 4, it will be understood that for setting the duplex curtain at the start, prior to any exposure but after the size of the curtain openings has been provided for, the knob 79 (shown in Fig. 4 and elsewhere) is turned in a clockwise direction as far as it will go when a click will be heard indicating the engagement of parts.

Referring next to Figs. 20 and 21 and to Figs. 23 to 26, it will be observed that below the gear 80 but in fixed relation therewith, as clearly shown in Fig. 24, there is a cam 137, and above the gear 73 there is a cam 138 rigid or fast with said gear 73, as is clearly evident from Figs. 25 and 26. The cam 137 is provided with a tooth 139 provided with a suitable shoulder and the cam 138 is provided with a tooth 140 providing a suitable shoulder and also provided with a notch 141. The said two cams 137, 138 are indicated in their assembled position by dotted lines in Fig. 22. The said cams and related parts of the assembly are also shown in Figs. 36 and 37.

Before describing the means for releasing the duplex curtain, we will advert to the means for permitting the mirror to snap or spring from focusing position into horizontal picture-taking position so as to get the mirror out of the way of the film and also to exclude light entering through the hood, inasmuch as that movement occurs at the same instant that the duplex curtain is released for picture-taking.

Figure 15:
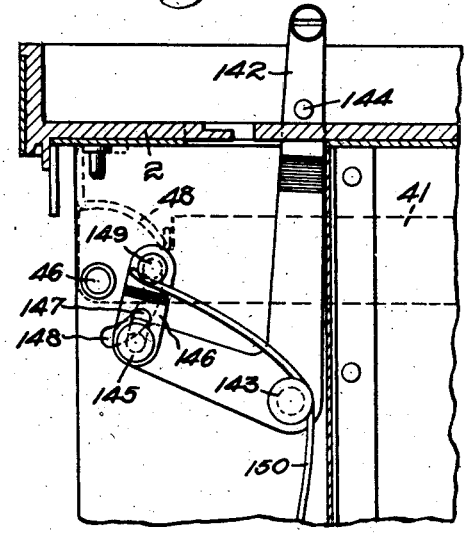
Fig. 15 is a detail in vertical cross section showing the mirror operating lever, the mirror being shown in the up position in dotted lines.
Figure 16:
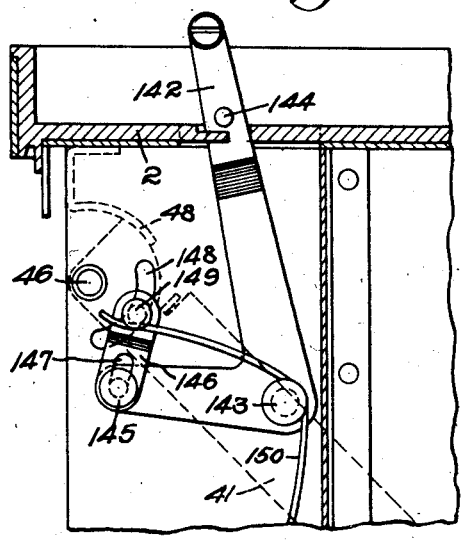
Fig. 16 is a similar view but showing the mirror in viewing position.
Figure 17:
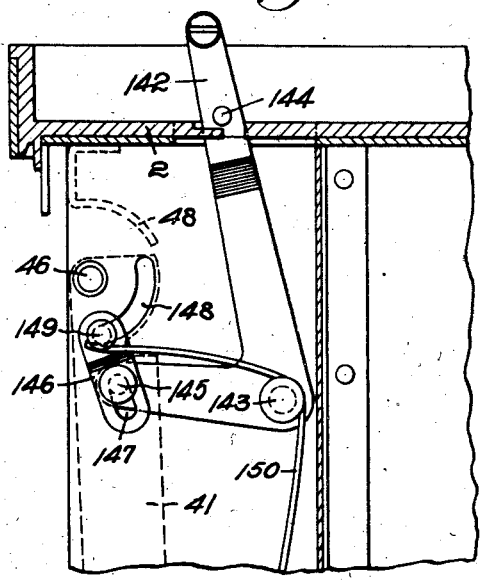
Fig. 17 is a similar view showing the mirror in its lowermost position, as when the camera is in folded position.
Figure 18:
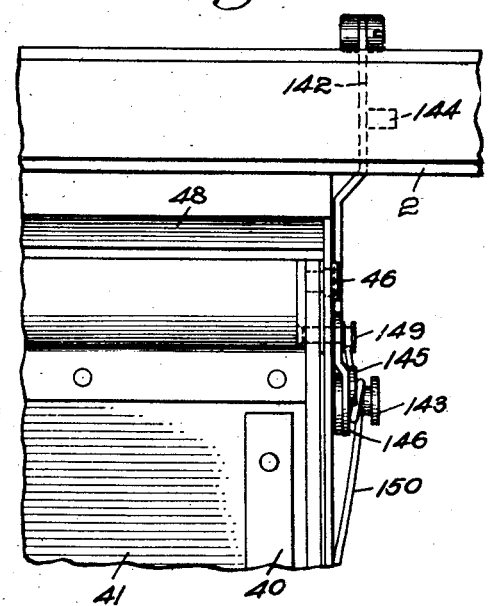
Fig. 18 is a detail in rear elevation, the casing being removed, the mirror being in folded position.

Referring to Figs. 15 to 18 and 31, there is provided a mirror positioning lever 142. It is of a right angled or bell crank construction and is pivoted upon a stud or pin 143 in the framing. Near its upper end it is provided with a transversely extending pin 144. The lower free end of the lever has pivoted thereto at 145 a short link 146, said link being provided with a slot 147. An arcuate slot 148 in the framing permits the proper movement of a pin 149 where said link 146 is connected to the mirror 41. In Fig. 15 is indicated the picture-taking position of the mirror, and in Fig. 16 the focusing position of the mirror. In said figures and in Fig. 17 is shown a spring 150 which tends to throw the mirror into the picture-taking position of Fig. 15.

When the mirror is in the focusing position as already described with respect to Fig. 3, the mirror is held in that position by the spring pressed plate or member 50. In order to let the mirror snap into the picture-taking position, the following mechanism is provided, it being understood that any reference to "mirror" means the mirror and mirror frame assembly.

As shown most clearly in Fig. 5, there is provided an upright rod 151 having a disk or button 152 at the upper end thereof, so that the rod may be pushed downward to release the mirror and permit it to snap into picture-taking position. The said rod 151 at its lower end is pivotally connected by pin 153 to a lever 154 that is itself pivoted at 155 in the framing. Rigid with said lever 154 is a lever arm 156 shown in dotted lines in Fig. 5. The end of said shorter lever arm 156 engages a plate or member 157 of a general V shape, as indicated in dotted lines in Fig. 5 which is secured to the plate or member 50. A coiled spring 158 surrounds the pivot 155.

With this construction of the parts, when the rod 151 is depressed, the mirror is released from the plate 50 and swings or snaps upward from the full line position indicated in Fig. 3 into the picture-taking position.

Having now described the means by which the mirror is permitted to snap into picture-taking position, we will now return to the description of the closely coordinated structure whereby the curtain is released for picture taking.

For this purpose we will particularly refer to Figs. 27 to 30. In Fig. 27 is shown a shutter latch at 158. Said latch is pivoted at 159 in the casing and upon the same pivot is mounted a detent 160, the purpose of which will be described later. The said latch 158 is provided with a notch 161 to permit it to clear the shaft of the small pinion 92 and with a tooth or point 162 adapted to take into the notch 141 of the cam disk 138 of Figs. 25 and 26.

A small latch lever 158a (most clearly shown in Figs. 22, 27 and 31) is provided with a pin or stud 163 having splined formations, as clearly shown in Fig. 31. The said pin receives a screw 164 by which it is connected to a disk or knob 165 on the outside of the casing under the cover 9. The said lever 158a has depending therefrom adjacent to the splined pin 163 a pin 166 that is adapted to be engaged by the pin 144 on the mirror operating lever 142, when said pin is in the position shown in Fig. 31, which will be the position of said pin 166 in instantaneous work. When, however, a picture is to be taken by bulb operation (that is to say, the curtain opening being in alignment with the lens as long as pressure is maintained upon the lever 177), the disk or knob 165 is turned 180 degrees so that the depending pin 166 is then in the position indicated in Fig. 31a. When in this position the mirror can be released to the picture-taking position because of the fact that the pin 144 on the mirror set lever 142 does not contact with pin 166, thereby tripping the shutter, because of the new position of the pin 166 (shown in Fig. 28).

The said splined pin 163 constitutes substantially a pivotal connection between the latch lever 158a and a floating lever 167 which at its upper end (viewing Fig. 22) is provided with an arcuate slot 168 and which at its lower end is provided with a slot 169 wherein is received the stud 170. The said floating lever 167 has a right angled extension 171 terminating in a hook 172 that is adapted to engage the shoulder or tooth 140 on the cam disk 138 of Figs. 25 and 26.

The detent 160 previously referred to is provided with a notch or recess 173 (clearly shown in Figs. 27, 28 and 30) to engage the tooth 139 on the cam disk 137, best shown in Figs. 23 and 24. The said detent 160 is provided with an extension or edge 174 to take a position against the adjacent edge of the latch 158. The purpose of this construction is to prevent winding of the curtain, after instantaneous exposure, until after the mirror has been reset.

Upon the top of the casing but inside the cover 9, there is provided a lever 175 pivoted at 176 and having an upturned edge or portion 177 to permit ready operation by the thumb of the user. The opposite end of said lever 175 is forked as indicated at 178 (Fig. 29) to receive the hub of the disk or knob 165 of Figs. 27 and 31. Thus by movement of said lever 175 the lever 158 is swung on its pivot in a clockwise direction viewing Fig. 22, so as to disengage the tooth or projection 162 thereof from the shoulder 140 of the cam 138 of Figs. 25 and 26.

Fig. 27 shows what is termed the "rest" position, namely, that to which the user of the camera gives a preliminary turn of the part in winding the curtain until he can more readily re-grasp the knurled hub or cup 79.

Figures 22, 28:
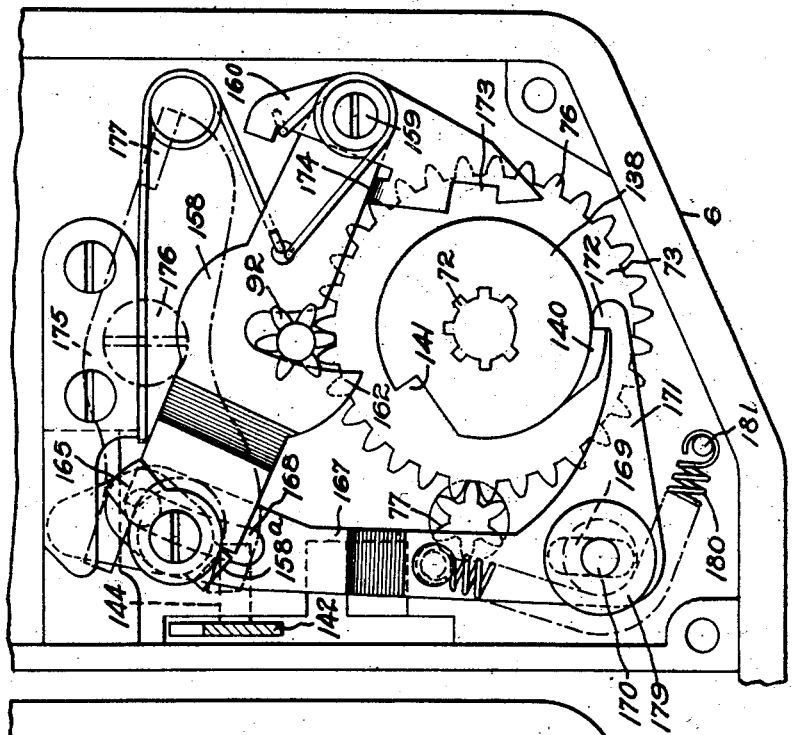
Fig. 22 is a top view, with the cover removed, of the shutter operating parts, the shutter being in fully wound position.
Fig. 28 is a similar view but with the parts in curtain open position.

The completely wound position of the parts is shown in Fig. 22, the tooth or projection 162 being in engagement with the tooth or shoulder 140, of cam 138 instead of with the recess 141 as in the "rest position". In Fig. 28 is shown the position of the parts after the lever 158 has been moved to release the curtain by withdrawing the tooth 152 from the notch 141, and the cam disk 138 turns until the hook 172 comes again into engagement with the tooth or shoulder 140, which condition remains so long as pressure is maintained on the bulb lever 177. The releasing of this lever, which disengages the hook 172 from the hook 152, allows the curtain to run all the way down in closed position.

Extending about a small roll or disk 179 on the pin 170 is a coiled spring 180, one end being connected to the floating lever 167 and the other end to the casing at 181.

In the operation of the camera, the lens door 20, 22 is opened from the position shown in Fig. 11, which will allow the mirror 41 to swing upward until it is engaged by the mirror latch or member 50 that will hold it in the inclined position of Fig. 3 for reflecting the image on the ground glass 42. The top cover 9 is next opened to allow the viewing hood 56 to spring into position. This places the camera in readiness for making an exposure, it having been previously loaded with a sensitized film. After the image has been sharply focused on the ground glass 42, the proper shutter opening is selected in the manner described at length.

Referring now to Fig. 22, the duplex or composite curtain has been wound up ready for instantaneous exposure. The upright rod 151 (best shown in Fig. 5) is depressed as previously described, and this permits the mirror 41 to snap or swing upward from the position shown in dotted lines in Fig. 16 into its horizontal position indicated in dotted lines in Fig. 15. This, it will be observed, causes the mirror-setting or mirror-positioning lever 142 to swing in a clockwise direction from the position of Fig. 16 to that of Fig. 15. This movement causes the pin 144 on the mirror-setting lever 142 to engage the pin 166, thereby withdrawing the tooth or projection 162 from the tooth or projection 140. This permits the curtain to move until the selected aperture of the curtain travels past the lens, thus making the exposure. Thereupon the curtain is rewound in the manner already described. This is done by moving the lever 142 into the position shown in Fig. 16.

There is with this camera no technical "time" exposure, but it is readily possible to make a time exposure by partially winding up the curtain and snapping the mirror out of the way. There are provided the various instantaneous exposures 1 to 9, and the bulb exposure, previously referred to, is accomplished in the manner already described, to which we will briefly refer again.

The knob or disk 165 is turned from the position shown in Fig. 31 to that shown in Fig. 31a, the mirror is released and the shutter knob is set at 1. The operator engages the lever 175 of Fig. 4, swinging it in a clockwise direction so that the knob or disk 165 causes the withdrawal of the tooth 162 from the notch 140, and the floating lever 167 engages by its hook 172 the tooth or shoulder 140 on the cam disk 138. The user retains said lever 175 in the position into which he has thrown the same. After the determined length of time for bulb exposure, the lever 175 is released, and this withdraws the hook 172 from the tooth or shoulder 140, thus permitting the cam disk 138 to return to the former position.

Having thus described one illustrative embodiment of the invention, it is to be understood that although specific terms are employed, they are used in a generic and descriptive sense and not for purposes of limitation, the scope of the invention being set forth in the following claims.

We claim:

1. A photographic camera provided with a suitable casing, a substantially right angled door member mounted for swinging movement in said casing, a lens mounted on said door member, and a mirror mounted within the lens casing and movable into functioning and non-functioning positions, said door being mounted in such relation to the functioning part of the mirror that said door in closing acts to move said mirror into non-functioning position.

2. A photographic camera provided with a suitable casing, a right angled door member pivoted in said casing, a lens mounted upon said door member, a mirror pivoted in said casing, and means within the casing to position said mirror at image reflecting position, the pivots of the door member and the mirror being so relatively positioned that the said door in swinging into closed position swings said mirror into non-functioning position.

3. A photographic camera provided with a suitable casing, a right angled door member pivoted in a wall of the casing, a mirror hinged within the casing and movable into vertical non-functioning position, into inclined image reflecting position and into horizontal position, means also within the casing to engage the mirror to retain the same in inclined position, the pivots of said door member and mirror being so interrelated and relatively positioned that the movement of the door into closed position swings the mirror into vertical non-functioning position.

4. In a photographic camera, a casing having a top cover, a hood mounted upon the casing beneath the cover and adapted to open upon opening the cover, a ground glass structure beneath said hood, a mirror pivotally mounted in the casing, latch means to engage the mirror to hold it in inclined image reflecting position, a right angled door structure at the front of the camera carrying a lens structure and adapted in the closing of the door to engage the mirror and move the same into non-functioning position.

5. In a photographic camera, a casing having a mirror hingedly mounted therein, latch means adapted to engage an edge of the mirror to retain the same in inclined image reflecting position, and a light guard carried by said latch means to exclude light from the space at the rear of the mirror when the latter is in inclined position.

6. In a photographic camera, a casing having a mirror pivoted upon one upright wall thereof, a mirror cooperating latch pivoted upon the bottom member of said casing, a right angled door member pivoted upon the front wall of said casing, a lens structure secured to said door member, the pivot of the door member being so located with respect to those of the latch and mirror respectively that in the closing of the door member the latter engages both the mirror and the latch to swing them into non-functioning position.

7. In a camera of the reflex type having a two-part casing, a mirror swingingly mounted in one member of said casing between upright walls thereof, means to hold said mirror in inclined image reflecting position, the other member of said casing having upright end walls spaced (when in position) from the said upright walls of said first mentioned member of the casing to provide a compartment at each end of the camera, a duplex curtain, rolls to receive the members of said curtain, said rolls being respectively mounted in said compartments, means whereby said curtain members may be adjusted to provide a series of different sized exposure openings, and means for drawing said curtain taut after each use thereof, and including means establishing a resistance against which the said curtain is pulled taut in rewinding.

8. In a photographic camera, a casing having a mirror pivotally mounted therein, a mirror positioning lever, a duplex curtain providing an adjustable opening, means for releasing the curtain, said mirror positioning lever acting in its movement to engage and operate said curtain releasing means.

9. In a photographic camera, a two-part casing, one part including a base, one side wall, two end walls and a portion of the opposite side wall, and the other part of the casing including the remainder of said opposite side wall of the casing and also including the casing cover.

10. In a photographic camera, a two-part casing, one part including a base, one side wall, two end walls and a portion of the opposite side wall, and the other part of the casing including the remainder of said opposite side wall of the casing and also including the casing cover, said second member of the casing supporting the lens curtain and film supporting means.

11. In a photographic camera, a casing member comprising a front wall member, a door hinged in said front wall member and carrying the lens mounting; a curtain and a film support, said casing member also carrying the curtain and the film support.

12. In a photographic camera, a casing member comprising a front wall member, a door hinged in said front wall member and carrying the lens mounting; a curtain, a film support and a reflecting mirror, said casing member also carrying the curtain, the film support and the reflecting mirror.

13. In a photographic camera, a two-part casing consisting of two members slidable one upon the other, one of said members being of a general box-like structure with one open side, the other member having a front wall slidable in said open side; a door and a lens structure both mounted upon said front wall so as to be foldable into exposing or concealed position by swinging movement of the door.

14. In a photographic camera, a casing having a door hinged in a wall thereof, a lens mounting, and a lens locking slidable member adapted to engage said lens mounting and said door to hold the two parts in fixed relation with each other.

15. In a photographic camera, a two-part casing of elongated form having a handle at one end, a cover mounted at the top on one part, a door at the front side hinged in a wall of said one part of the casing, and a lens mounted upon said door so as to be projected with the opening of the door into picture-taking position or to be retracted with the folding of the door into concealed position.

16. In a photographic camera, of the reflex type having a casing provided with a top cover hinged thereto, a ground glass mounted in the top of the casing beneath said cover, a mirror swingingly mounted in said casing, means to hold said mirror in inclined image reflecting position, a collapsible viewing hood mounted on said casing under the said cover but above said ground glass, and a magnifying lens mounted in a collapsible wall of said hood.

17. In a photographic camera, of the reflex type having a casing provided with a top cover hinged thereto, a ground glass mounted in the top of the casing beneath said cover, a mirror swingingly mounted in said casing, means to hold said mirror in inclined image reflecting position, a collapsible viewing hood mounted on said casing under the said cover but above said ground glass, and a magnifying lens pivotally mounted in a collapsible wall of said hood, so as to be folded flatwise against the said wall of the hood when the camera is closed and to be swung upon said pivot into viewing position transverse to the viewing axis of the hood when the latter is in viewing position.

18. In a photographic camera, of the reflex type having a casing provided with a top cover hinged thereto, a ground glass mounted in the top of the casing beneath said cover, a mirror swingingly mounted in said casing, means to hold said mirror in inclined image reflecting position, a collapsible viewing hood mounted on said casing under the said cover but above said ground glass, and a magnifying lens pivotally mounted in a collapsible wall of the hood and adapted, when the hood is opened, to be swung upon its pivot into functioning position transverse to the viewing axis of the hood, the said lens mounting having a part extending through said wall of the hood into position to be engaged and opened by the user of the camera for swinging said lens into functioning position.

19. In a photographic camera, a two-part casing, one part including a base, one side wall and two end walls, and the second part of the casing including at least a part of the opposite side wall and having a top cover hinged thereto.

20. In a photographic camera, a two-part casing, one part including a base, one side wall and two end walls and a portion of the opposite side wall constituting an extension of said two end walls, and the second part of the casing including at least a part of the opposite side wall and having a top cover hinged thereto.

21. In a photographic camera, a two-part casing, one part including a base, one side wall and two end walls, and the second part of the casing including at least a part of the opposite side wall and having a top cover hinged thereto, and a folding hood mounted under the said cover.

22. In a photographic camera, a two-part casing, one part including a base, one side wall and two end walls, and the second part of the casing including at least a part of the opposite side wall and having a top cover hinged thereto, said opposite side wall having a door hinged therein and a lens fastened to the said door.

23. In a photographic camera, a two-part casing, one part including a base, one side wall and two end walls, and the second part of the casing including at least a part of the opposite side wall and having a top cover hinged thereto, and film supporting means and a lens curtain both carried by said second part of the casing.

24. In a photographic camera, a two-part casing, one part including a base, one side wall and two end walls, and the second part of the casing including at least a part of the opposite side wall and having a top hinged cover, and film supporting means, a lens curtain and a hinged mirror all mounted in said second part of the casing.

25. In a photographic camera, a two-part casing of elongated form having a handle at one end, a cover mounted at the top of one part, a door at the front side hinged in a wall of said one part of the casing, a collapsible hood secured to said part of the casing under the said cover, and a lens mounted upon said door so as to be projected with the opening of the door into picture-taking position or to be retracted with the folding of the door into concealed position.

26. A photographic camera provided with a suitable casing, an angular pivoted door structure at the front of said casing, a lens structure directly carried by said door, a mirror swingingly mounted in said casing, means to hold the mirror in inclined image-reflecting position, said door structure and said mirror being pivoted in such relation to each other that the door structure swings the mirror into upright position in the act of closing the said door.

27. A photographic camera provided with a suitable casing, an angular pivoted door structure at the front of said casing, a lens structure directly carried by said door, a mirror swingingly mounted in said casing, said door structure and the mirror having their points of pivotal mounting so relatively located that the door structure has an impinging or wiping action against the mirror member to swing the mirror into upright position.

28. A photographic camera provided with a suitable casing, an angular pivoted door structure at the front of said casing, a lens structure directly carried by said door, a mirror swingingly mounted in said casing, said mirror being movable upon its pivot into either a horizontal, an inclined or a vertical position, the pivotal mountings of the door structure and said mirror being so relatively located that the door structure swings the mirror into its vertical position in closing the door.

29. A photographic camera provided with a suitable casing, an angular pivoted door structure at the front of said casing, a lens structure directly carried by said door, a mirror swingingly mounted in said casing, the pivot of the door structure being such that said door structure engages the means that holds the mirror in inclined position, in the closing movement of the door structure, and swings said mirror holding means downwardly to release the mirror.

30. A photographic camera provided with a suitable casing, an angular pivoted door structure at the front of said casing, a lens structure directly carried by said door, a mirror swingingly mounted in said casing, the pivot of the door structure being such that said door structure engages the means that holds the mirror in inclined position, in the closing movement of the door structure, and swings said mirror holding means downwardly to release the mirror, said door structure in closing impinging against the mirror mounting to swing said mirror into upright position.

31. A photographic camera provided with a suitable casing, an angular pivoted door structure at the front of said casing, a lens structure directly carried by said door, a mirror swingingly mounted in said casing, the pivot of the door structure being such that said door structure engages the means that holds the mirror in inclined position, in the closing movement of the door structure, and swings said mirror holding means downwardly to release the mirror, said door structure in closing impinging against the mirror mounting to swing said mirror into upright position, said mirror having a horizontal, an inclined and a vertical position.

32. In a photographic camera, a casing having a top cover, a mirror pivotally mounted in the casing, means to engage the mirror to hold it in inclined image-reflecting position, and an angular door structure at the front of the camera carrying a lens structure and adapted, in the closing of the door, to engage the mirror and move the same into non-functioning position.

33. In a photographic camera, a casing having a mirror hingedly mounted therein, latch means adapted to engage an edge of the mirror to retain the same in inclined image-reflecting position, a light guard carried by said latch means to exclude light from the space at the rear of the mirror when the latter is in an inclined position, and a light guard at the pivotal end of the mirror.

34. In a photographic camera, a casing having a mirror hingedly mounted therein, latch means adapted to engage an edge of the mirror to retain the same in inclined image-reflecting position, a light guard carried by said latch means to exclude light from the space at the rear of the mirror when the latter is in an inclined position, a light guard at the pivotal end of the mirror, and a co-acting light guard secured to the inside of the casing, said two last mentioned light guards occupying a face to face relation and relatively slidable upon each other in the movement of the mirror.

35. In a camera of the reflex type having a two-part casing, a mirror swingingly mounted in one member of said casing between upright walls thereof, means to hold said mirror in inclined image reflecting position, the other member of said casing having upright end walls spaced (when in position) from the said upright walls of said first mentioned member of the casing to provide a compartment at each end of the camera, a duplex curtain, rolls upon which the members of said curtain are respectively mounted, said rolls being respectively mounted in said compartments, means to move said curtain members relatively to each other to provide any one of a series of different sized exposure openings, and means for moving said curtain members as a unit constituting a duplex curtain.

36. In a camera of the reflex type having a two-part casing, a mirror swingingly mounted in one member of said casing between upright walls thereof, means to hold said mirror in inclined image reflecting position, the other member of said casing having upright end walls spaced (when in position) from the said upright walls of said first mentioned member of the casing to provide a compartment at each end of the camera, a duplex curtain, rolls upon which the members of said duplex curtain are respectively mounted, said rolls being respectively mounted in said compartments, means to move said curtain members relatively to each other to provide any one of a series of different sized exposure openings, and means for moving said curtain members as a unit constituting a duplex curtain, and pawl and cam means to control the movements of said curtain members.

37. In a camera of the reflex type having a two-part casing, a mirror swingingly mounted in one member of said casing between upright walls thereof, means to hold said mirror in inclined image reflecting position, the other member of said casing having upright end walls spaced (when in position) from the said upright walls of said first mentioned member of the casing to provide a compartment at each end of the camera, a duplex curtain, each member of said curtain being provided with a take-up and a let-off roll, said rolls being respectively mounted in said compartments, cams 137, 138 controlling the movement of said curtains, pawl means to engage said cams, and means to operate said pawls.

38. In a camera of the reflex type having a two-part casing, a mirror swingingly mounted in one member of said casing between upright walls thereof, means to hold said mirror in inclined image reflecting position, the other member of said casing having upright end walls spaced (when in position) from the said upright walls of said first mentioned member of the casing to provide a compartment at each end of the camera, a curtain, take-up and let-off rolls for said curtain, said rolls being respectively mounted in said compartments, and means for controlling the release of said curtain from said let-off roll including latch 158, cam 138 engageable by said latch, floating lever 167 to engage said cam 138, cam 137, and detent 160 carried by latch 168 to engage said cam 137.

39. In a camera of the reflex type having a two-part casing, a mirror swingingly mounted in one member of said casing between upright walls thereof, means to hold said mirror in inclined image reflecting position, the other member of said casing having upright end walls spaced (when in position) from the said upright walls of said first mentioned member of the casing to provide a compartment at each end of the camera, a curtain, take-up and let-off rolls for said curtain, said rolls being respectively mounted in said compartments, and means for controlling the release of said curtain from said let-off roll including latch 158 carrying detent 160, cam 138 engageable by said latch, floating lever 167 to engage cam 138, and cam 137 engageable by said detent.

40. In a camera, a curtain, take-up and let-off rolls therefor, and means for controlling the release of said curtain from said let-off roll including latch 158 carrying detent 160, cam 138 engageable by said latch, floating lever 167 to engage cam 138, and cam 137 engageable by said detent, said detent 160 having a portion to engage said latch 158 to prevent curtain winding until the mirror is reset, said camera having a pivoted mirror.

41. In a camera, a curtain, take-up and let-off rolls therefor, and means for controlling the release of said curtain from said let-off roll including latch 158 carrying detent 160, cam 138 engageable by said latch, floating lever 167 to engage cam 138, and cam 137 engageable by said detent, said detent 160 having a portion to engage said latch 158 to prevent curtain winding until the mirror is reset, and a lever 175 to be engaged by the operator to operate lever 158 and to release the cam 138.

42. In a photographic camera, a casing having a pivoted mirror adapted to swing respectively into horizontal, into inclined and into upright positions, latch means to hold the mirror in inclined position, an upright rod 151 connected to said latch means, a mirror operating lever 142 having a projection 144, the curtain having a cam 138 controlling the release thereof and a pin 166 to release said cam 138, said pin 166 being positionable in the path of the projection 144.

43. A photographic camera provided with a suitable casing, a right angled door member pivoted in the casing, a lens mounted upon said door member, a mirror pivoted in said casing, means within the casing to position said mirror at image-reflecting position, the pivots of the door member and the mirror being so relatively positioned that the door member directly engages the mirror member in closing, and thereby swings the mirror into non-functioning position.

44. In a reflex photographic camera, a casing, a pivoted mirror therein having spring means to swing the same into horizontal position, means to hold said mirror in inclined reflecting position, an upright push rod 151 to release the mirror from said inclined position, a mirror-positioning lever 142, projection 144 on said lever 142, shutter latch lever 158, curtain means, cam 138 for controlling the release of said curtain latch lever 158a, a pin 166 carried by said latch lever, said pin 166 being engageable by said projection 144.

45. In a reflex photographic camera, a casing, a pivoted mirror therein having spring means to swing the same into horizontal position, means to hold said mirror in inclined reflecting position, an upright push rod 151 to release the mirror from said inclined position, a mirror-positioning lever 142, projection 144 on said lever 142, shutter latch lever 158, curtain means, cam 138 for controlling the release of said curtain latch lever 158a, a pin 166 carried by said latch lever, said pin 166 being mounted for movement out of the path of movement of the projection 144 so as to permit bulb operation.

46. In a reflex photographic camera, a casing, a pivoted mirror therein having spring means to swing the same into horizontal position, means to hold said mirror in inclined reflecting position, an upright push rod 151 to release the mirror from said inclined position, a mirror-positioning lever 142, projection 144 on said lever 142, shutter latch lever 158, curtain means, cam 138 for controlling the release of said curtain, latch lever 158a, a pin 166 carried by said latch lever, said pin 166 being engageable by said projection 144, an operating lever 175 adapted to be engaged by the hand of the user to operate shutter latch lever 158

WILLIAM H. PETIT.
EDSON S. HINELINE.